US007203919B2

(12) United States Patent
Suaris et al.

(10) Patent No.: US 7,203,919 B2
(45) Date of Patent: Apr. 10, 2007

(54) RETIMING CIRCUITS USING A CUT-BASED APPROACH

(76) Inventors: Peter Suaris, 4021 NW. Barlow Ct., Camas, WA (US) 98607; Dongsheng Wang, 4716 Avery La., Lake Oswego, OR (US) 97035

( * ) Notice: Subject to any disclaimer, the term of this patent is extended or adjusted under 35 U.S.C. 154(b) by 190 days.

(21) Appl. No.: 10/504,217

(22) PCT Filed: Mar. 18, 2004

(86) PCT No.: PCT/US2004/086900

§ 371 (c)(1),
(2), (4) Date: Aug. 10, 2004

(87) PCT Pub. No.: WO2004/084277

PCT Pub. Date: Sep. 30, 2004

(65) Prior Publication Data

US 2005/0132316 A1    Jun. 16, 2005

Related U.S. Application Data

(60) Provisional application No. 60/524,300, filed on Nov. 21, 2003, provisional application No. 60/456,306, filed on Mar. 19, 2003.

(51) Int. Cl.
*G06F 17/50* (2006.01)
(52) U.S. Cl. .............................................. 716/6; 716/5
(58) Field of Classification Search ...................... 716/2, 716/4–6
See application file for complete search history.

(56) References Cited

U.S. PATENT DOCUMENTS 5,751,593 A * 5/1998 Pullela et al. .................. 716/6

| 7,000,137 | B2 * | 2/2006 | Sivaraman et al. | 713/500 |
| 7,010,763 | B2 * | 3/2006 | Hathaway et al. | 716/2 |
| 2002/0023252 | A1 * | 2/2002 | Lee et al. | 716/6 |

OTHER PUBLICATIONS

Deokar et al., "A Fresh Look at Retiming via Clock Skew Optimization," *Proceedings of the 32nd DAC*, 5 pgs (1995).
Fishburn, "Clock Skew Optimization," *IEEE Trans. on Computers*, vol. 39, No. 7, pp. 945-951 (Jul. 1990).
Leiserson et al., "Optimizing Synchronous Circuitry," *J. VLSI and Computer Systems*, pp. 41-67 (1983).

(Continued)

*Primary Examiner*—Thuan Do
*Assistant Examiner*—Binh Tat
(74) *Attorney, Agent, or Firm*—Klarquist Sparkman, LLP

(57) ABSTRACT

Methods and apparatus for retiming an integrated circuit are described. According to certain embodiments, the retiming comprises performing a timing analysis for one or more paths in the integrated circuit to obtain slack values, selecting one of the paths based on the slack values obtained, and determining a retimeable cut along the path selected. The retimeable cut in these exemplary embodiments comprises a set of input pins for one or more logic instances in the integrated circuit to which one or more retimed sequential elements can be coupled in order to improve the slack value of the path selected. In particular embodiments, the retimeable cut is automatically selected from multiple possible cuts along the path selected. Other embodiments for retiming integrated circuits are disclosed, as well as integrated circuits and circuit design databases retimed by the disclosed methods. Computer-executable media storing instructions for performing the disclosed methods are also disclosed.

46 Claims, 20 Drawing Sheets

OTHER PUBLICATIONS

Liu et al., "Maximizing Performance by Retiming and Clock Skew Scheduling," *Proceedings of the 36th DAC*, pp. 231-236 (1999).

Malik et al., "Retiming and Re-synthesis: Optimizing Sequential Networks with Combinational Techniques," *IEEE Trans. on CAD*, vol. 10, No. 1, pp. 74-84 (Jan. 1991).

Pan, "Performance-driven Integration of Retiming and Resynthesis," *Proceedings of the 36th DAC*, pp. 243-246 (1999).

Shenoy et al., "Efficient Implementation of Retiming," *IEEE Intl. Conf. on CAD*, pp. 226-233 (1994).

Singh et al., "Integrated Retiming and Placement for Field Programmable Gate Arrays," *FPGA '2002*, pp. 67-76 (2002).

Suaris et al., "Smart Move: A Placement-aware Retiming and Replication Method for Field Programmable Gate Arrays," *Proc. ASICON'2003*, Beijing, China, pp. 67-70 (2003).

Cong et al., "FlowMap: An Optimal Technology Mapping Algorithm for Delay Optimization in Lookup-Table Based FPGA Designs," *IEEE Trans. on Computer-Aided Design*, vol. 13, No. 1, pp. 1-12 (Jan. 1994).

\* cited by examiner

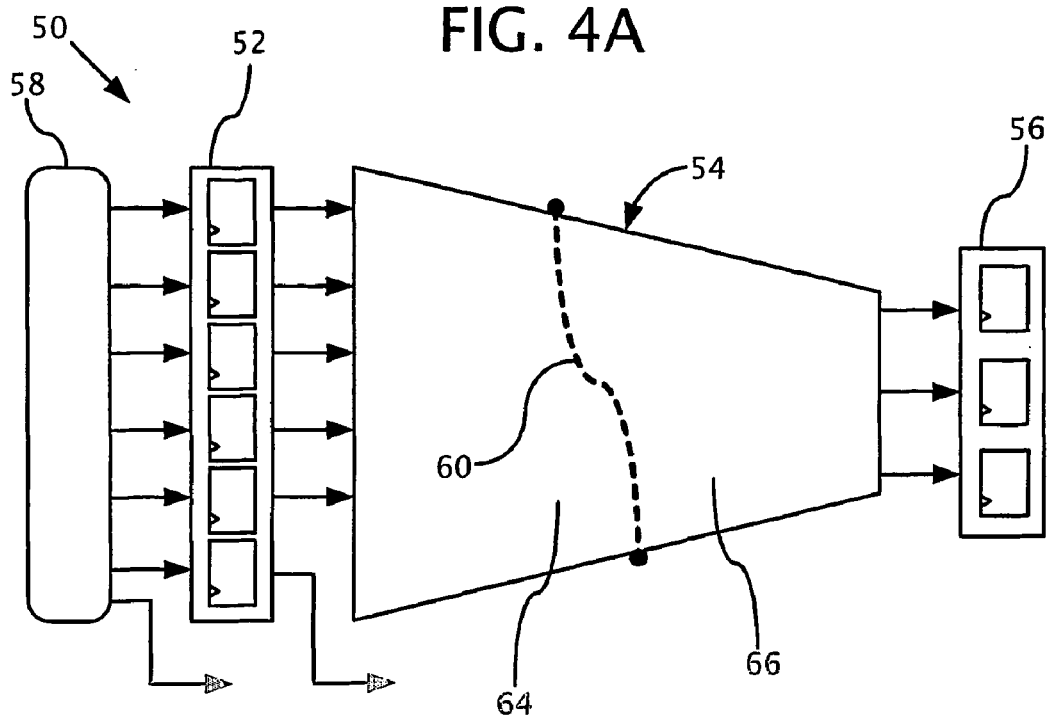
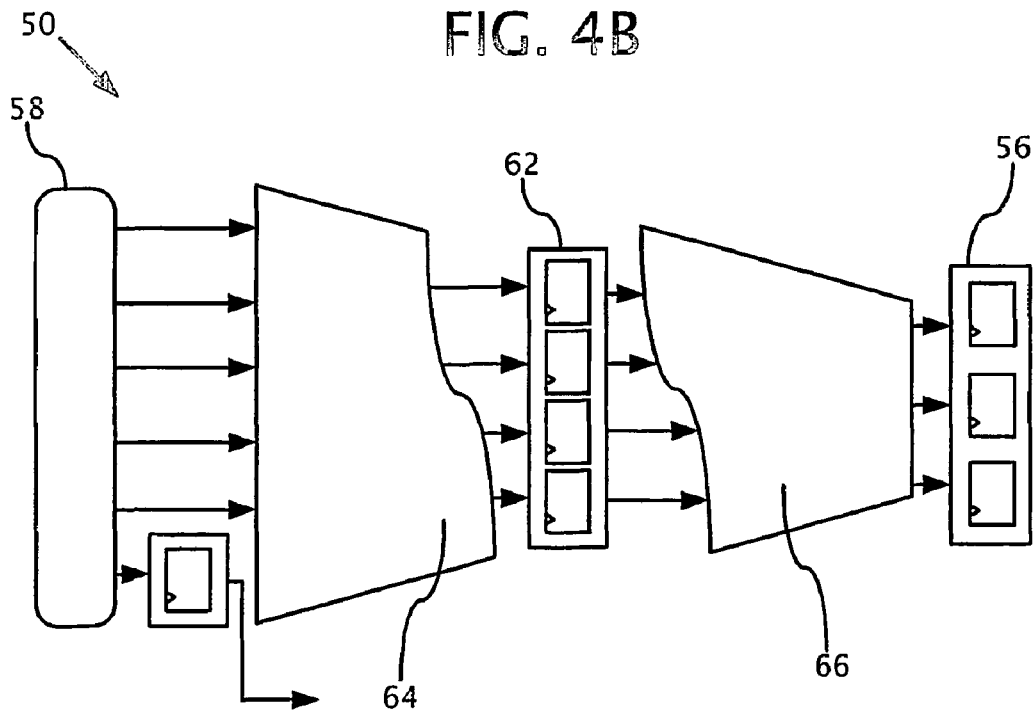

RETIMING CIRCUITS USING A CUT-BASED APPROACH

CROSS-REFERENCE TO RELATED APPLICATIONS

This is the National Stage of International Application No. PCT/US2004/008690, filed Mar. 18, 2004, which claims the benefit of U.S. Provisional Application No. 60/456,306, filed Mar. 19, 2003, and claims the benefit of U.S. Provisional Application No. 60/524,300, filed Nov. 21, 2003. All applications are incorporated herein in their entirety.

TECHNICAL FIELD

This application relates to the retiming of integrated circuits, such as field programmable gate arrays.

BACKGROUND

With the advent of electronic design automation (EDA), the design of complex hardware systems no longer begins with a hardware circuit diagram. Instead, circuit design typically begins with a software program that describes the behavior or functionality of the hardware system. In one exemplary approach, the behavior or functionality of an electronic circuit design may be described using a hardware-description language (HDL) (e.g., VHDL, Verilog, or other such language). Circuit designers may use EDA logical synthesis tools to generate a netlist that comprises a list of the elements in the circuit and the interconnections between them. At the logical synthesis stage, designers can generate alternative architectures for an integrated circuit by modifying certain design constraints (e.g., the clock, the number and type of data path elements, and/or the desired number of clock cycles for performing a certain function). During the physical design stage, the netlist and information about the layout of the circuit can be used to determine the placement of the various elements of the circuit and the routing. The physical circuit embodying the design can then be created.

As part of the EDA process, the timing characteristics of the circuit design are typically evaluated. This may be done during logical synthesis and before detailed placement and routing of the circuit. Timing analysis may also be performed during the physical synthesis stage of the EDA process following detailed placement and routing. Timing analysis typically involves evaluating whether the circuit design tolerates signal delays inherent in the design. For example, for a given clock speed, a particular circuit design may require that a signal propagate through a circuit path or circuit element within a certain amount of time in order to function properly. During the timing analysis, the actual delay time for a particular path or element is determined and compared with the time required by the path or element. This comparison can be used to determine whether the signal delay time along the path (the path delay) meets the required time delay for that path. The amount by which the actual delay time differs from the required delay time can be referred to generally as "slack." As used herein, slack may be positive, indicating that the signal propagates faster (i.e., in less time) than required and that there is some spare time built into the timing. Slack may also be negative, indicating that the signal does not propagate in sufficient time to meet the timing requirements of the circuit. Or slack may be zero, indicating that the signal propagates in sufficient time to meet the required time delay, but with no spare time remaining. Consequently, a zero or positive slack indicates that the path or element complies with timing requirements, and a negative slack indicates that the circuit path or element fails to meet the timing requirements at the clock speed at which it is desired to operate the circuit In a technique referred to collectively as "retiming," circuit elements can be repositioned, reconfigured, or possibly removed from the circuit design in order to reduce or increase the delay of a particular circuit path. Retiming is desirably performed so that the functionality of the circuit is unchanged. That is, the observable behavior of the circuit after retiming should be identical to the behavior of the circuit before retiming. Ordinarily, retiming involves the movement of sequential elements (e.g. flip-flops, latches, registers, or other such clocked elements) across logic instances (e.g., combinational logic, look-up-tables (LUTs), etc.). Retiming can be performed, for example, to minimize the clock period required to operate the circuit, reduce the number of registers in the circuit, and/or to reduce the power consumed by the circuit. For example, if retiming is performed to minimize the clock period, one or more sequential elements can be relocated in the circuit such that all circuit paths have zero or positive slack. Alternatively, the clock speed may be slowed to increase the required delay times so that all circuit paths of the circuit have zero or positive slack.

In order to be effective, retiming techniques should be as accurate as possible and reliably predict the actual performance of the integrated circuit. Many conventional retiming techniques, however, do not accurately account for circuit delay caused by interconnect. With the continuous trend toward smaller feature sizes and faster clock speeds, the delay caused by the interconnect of a circuit has become a major concern. Indeed, as much as 70% of the delay in a circuit may be caused by interconnect. Accordingly, effective retiming operations that can analyze and account for interconnect delay is important to effective circuit design. Moreover, with the increasing popularity of field programmable gate arrays (FPGAs), retiming techniques that can account for the architectural and structural constraints inherent to FPGA designs are desirable.

SUMMARY

Various new and non-obvious exemplary methods for retiming integrated circuits are disclosed together with related apparatus. The methods can be used, for example, to retime a field programmable gate array (FPGA) or other such programmable logic device, or to retime any integrated circuit having retimeable sequential elements. The disclosed exemplary methods should not be construed as limiting in any way. Instead, the present disclosure is directed toward novel and nonobvious features and aspects of the various disclosed embodiments, alone and in various combinations and subcombinations with one another. The methods are not limited to any specific aspect or feature or combinations thereof, nor do the disclosed methods require that any one or more specific advantages be present or problems be solved.

One of the disclosed embodiments is an exemplary method for retiming an integrated circuit. According to this method, a timing analysis is performed for one or more paths in the integrated circuit to obtain delay times for a signal propagating along the paths. One of the paths is selected based on the delay times obtained. The path selected has a delay time that fails a timing constraint, and originates at a source sequential element and ends at a destination sequential element. The path selected additionally comprises two or more logic instances. A retiming location along the path selected is determined. The retiming location is a location where one of the source sequential element or the destination sequential element can be repositioned in order to satisfy the timing constraint. Moreover, in this exemplary embodiment, the retiming location is at least two logic instances from the one of the source sequential element or the destination sequential element that can be repositioned. A design database of the integrated circuit is updated to reposition the one of the source sequential element or the destination sequential element to the retiming location. In some embodiments, the act of performing the timing analysis further comprises determining slack values using the delay times obtained and the timing constraint. The slack values may then be evaluated during the act of selecting the path. In certain embodiments, the act of determining the retiming location comprises determining whether one or more additional sequential elements need to be repositioned to the retiming location or to one or more additional locations in order to maintain circuit functionality. The retiming location and the one or more additional locations can comprise a retimeable cut. In certain embodiments, the act of determining the retiming location can comprise performing at least one forward trace from one or more output pins of a logic instance across which the one of the source sequential element or the destination sequential element can be repositioned. The act of determining the retiming location can further comprise performing at least one backward trace from one or more input pins of the logic instance across which the one of the source sequential element or the destination sequential element can be repositioned. The disclosed method may further comprise the act of determining a retimed initial state for the one of the source sequential element or the destination sequential element. The method may also comprise relaxing architectural constraints of the one of the source sequential element or the destination sequential element (e.g., by separating one or more control signals from the respective sequential element).

In another disclosed method for retiming an integrated circuit, a failing signal path in the integrated circuit is identified. The failing signal path originates at a source sequential element, extends through one or more logic instances of a logic cone, and ends at a destination sequential element. The failing signal path has a delay time that fails to meet a timing constraint. A location along the failing signal path is selected where one of the source sequential element or the destination sequential element can be repositioned to improve the delay time of the failing signal path. According to this exemplary embodiment, the location selected is related to one of the logic instances along the failing signal path. From the location selected, output paths and input paths of the related logic instance are searched to identify one or more additional sequential elements to reposition in order to retain circuit functionality. In certain embodiments, the act of searching the output paths and the input paths comprises identifying one or more additional locations in the integrated circuit for repositioning the one or more additional sequential elements in order to retain circuit functionality. The location in the failing path and the one or more additional locations can together comprise a retimeable cut. The location in the failing signal path may comprise a portion of a forward-retimeable cut, and the act of searching the output paths and the input paths may comprise verifying that the selected one of the logic instances is driven by one or more sequential elements or a constant input/output pin. Alternatively, the location in the failing signal path may comprise a portion of a backward-retimeable cut, and the act of searching the output paths and the input paths may comprise verifying that the selected one of the logic instances drives one or more sequential elements. In one embodiment, the location along the failing signal path is one of multiple possible locations for relocating the one of the source sequential element or the destination sequential element, and the location selected for the one of the source sequential element or the destination sequential element results in the greatest improvement in slack time for the failing signal path. In some embodiments, the method further comprises determining a retimed initial state of the one of the source sequential element or the destination sequential element that can be repositioned, or one or more of the additional sequential elements identified. The method can also comprise relaxing architectural constraints of the one of the source sequential element or the destination sequential element that can be repositioned, or one or more of the additional sequential elements identified. (e.g., by separating one or more control signals from the respective sequential element).

An exemplary method for identifying a retimeable cut in an integrated circuit is also disclosed. In this embodiment, a signal path to be retimed is selected. The signal path originates at a source sequential element, extends through one or more logic instances, and ends at a destination sequential element. A retimeable cut along the signal path is found. The act of finding the retimeable cut can comprise performing a forward trace from one or more output pins of a selected logic instance in the signal path, and performing a backward trace from one or more input pins of the selected logic instance in the signal path. A timing evaluation is performed using the retimeable cut to determine delay times associated with the retimeable cut. In some embodiments, the retimeable cut is saved if the delay times do not violate any timing constraints. In certain embodiments, the retimeable cut is a first retimeable cut, and the method further comprises finding a second retimeable cut along the signal path, performing a timing evaluation using the second retimeable cut to determine delay times associated with the second retimeable cut, and comparing the slack times associated with the first retimeable cut with the slack times associated with the second retimeable cut to determine a best retimeable cut. The best retimeable cut can be the retimeable cut that produces the greatest overall improvement in slack values for the signal path to be retimed. In some embodiments, the retimeable cut is a forward-retimeable cut, whereas in other embodiments, the retimeable cut is a backward-retimeable cut. The method may further comprise determining retimed initial states of one or more sequential elements that are included in the retimeable cut, or separating control signals of one or more sequential elements that are included in the retimeable cut.

Another disclosed method for retiming an integrated circuit comprises a step for performing a timing analysis for one or more paths in the integrated circuit to obtain slack values, a step for selecting one of the paths based on the slack values obtained, and a step for determining a retimeable cut along the path selected. The retimeable cut according to this embodiment comprises a set of input pins for one or more logic instances in the integrated circuit to which one or more retimed sequential elements can be coupled, respectively, in order to improve the slack value of the path selected. In this embodiment, the retimeable cut is automatically selected from multiple possible cuts along the path selected. In one particular implementation, the set of input pins is associated with a logic instance at least two logic instances from at least one of the retimed sequential elements. In some embodiments, the method further comprises a step for determining an initial state for at least one of the retimed sequential elements, or a step for relaxing architectural constraints of at least one of the retimed sequential elements. In certain embodiments, the method further comprises a step for performing a forward trace and a backward trace from a logic instance related to the retimeable cut. The retimeable can be a backward-retimeable cut or a forward-retimeable cut.

Any of the disclosed embodiments may be performed by a computer programmed with computer-executable instructions stored on a computer-readable medium. In these embodiments, the computer-executable instructions cause the computer to perform any of the disclosed embodiments. Moreover, any of the disclosed embodiments can be used to update or modify circuit design information stored on a computer-readable medium. Accordingly, modified design databases storing circuit designs retimed by the methods described herein are also disclosed. Such methods can be performed, for instance, on a stand-alone workstation or via a network. Moreover, integrated circuits retimed by the disclosed methods are also disclosed (e.g., an FPGA retimed by any of the disclosed methods).

These and other features are set forth below with reference to the accompanying drawings.

BRIEF DESCRIPTION OF THE DRAWINGS

FIGS. 4A–4B are block diagrams illustrating an example of a process of repositioning registers to a retimeable cut in a logic cone of an exemplary field programmable gate array (FPGA).

DETAILED DESCRIPTION

Figure 1:
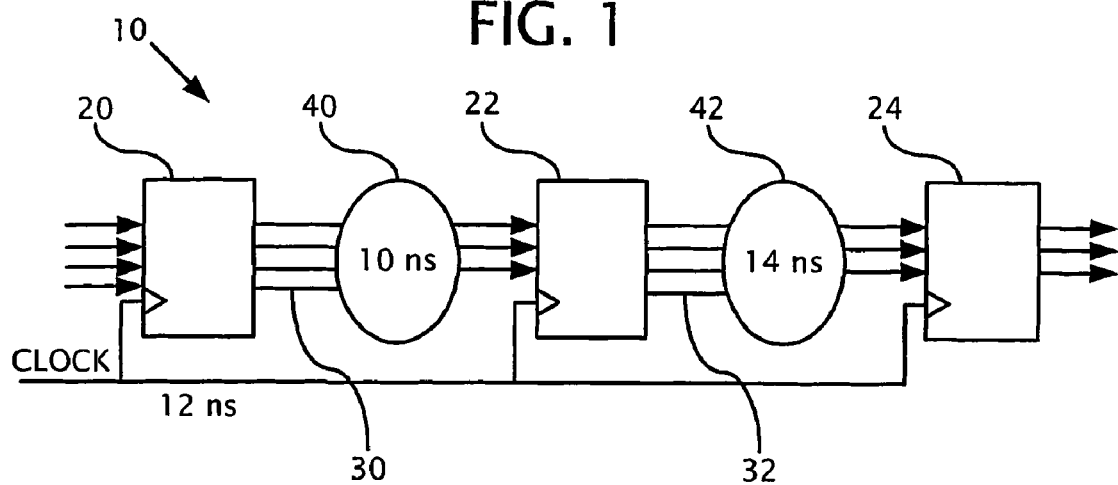
FIG. 1 is a block diagram illustrating an exemplary pipeline comprising sequential elements and logic instances.

Disclosed below are representative embodiments of methods for analyzing and retiming a circuit design. The disclosed methods should not be construed as limiting in any way. Instead, the present disclosure is directed toward novel and nonobvious features and aspects of the various disclosed embodiments, alone and in various combinations and subcombinations with one another. The methods are not limited to any specific aspect or feature or combinations thereof, nor do the disclosed methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "evaluate" to describe the disclosed methods. These terms are high-level abstractions of the actual operations that are performed. The actual operations that correspond to these terms will vary depending on the particular implementation and are readily discernible by one of ordinary skill in the art.

The disclosed embodiments can be applied to a wide variety of sequential integrated circuits. A sequential integrated circuit (or sequential circuit) is one whose outputs depend not only on its current inputs, but also on the past sequence of inputs, possibly arbitrarily far back in time. Examples of sequential circuits include programmable logic devices (PLDs) such as field programmable gate arrays (FPGAs), application-specific integrated circuits (ASICs), and systems-on-a-chip (SoCs). A sequential circuit contains at least one sequential circuit element, such as a flip-flop, synchronous RAM element, or latch. A sequential circuit element (or sequential element) generally refers to any circuit element whose outputs state changes occur at times specified by a free-running clock signal.

Any of the disclosed methods can be performed using software stored on a computer-readable medium and executed on a computer. Such software can comprise, for example, an electronic-design-automation (EDA) software tool used, for instance, for logical or physical synthesis. Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For the same reason, computer hardware is not described in detail.

The disclosed methods can be used at one or more stages of an overall synthesis scheme. For example, any of the retiming methods disclosed can be utilized to optimize or improve the design after logical synthesis. The retiming methods disclosed can also be used after placement and routing is performed in order to improve the implemented design. At this stage, additional physical information, such as interconnect delay, is typically available and delay times can be more accurately computed.

In general, retiming involves repositioning, reconfiguring, and possibly removing circuit elements from the circuit design in order to reduce or increase the delay of a particular circuit path. The methods for retiming an integrated circuit disclosed herein involve the repositioning of sequential elements, such as flip-flops, latches, or other such clocked elements. The term "register" is often used herein to refer to a flip-flop or equivalent sequential element in an FPGA.

Typically, a path of the integrated circuit originates at the output of a specific source sequential element, extends along interconnect through multiple logic instances, and ends at the input of a specific destination sequential element. A source sequential element output may drive two or more paths if the output is connected to the input of more than one destination sequential element, and a destination sequential element input may comprise the destination of two or more paths if it is driven by the outputs of more than one source sequential element through a logic cone. For purposes of this disclosure, the term "path delay" or the "delay time" of a path refers to the time it takes for a signal to propagate from the source sequential element to the destination sequential element of the path through the one or more logic instances. Path delay ordinarily includes both the internal delay of the circuit elements along the path (excluding the source and destination sequential elements) and interconnect delay along the path. In alternative embodiments, however, the path delay may include either or both of the source sequential element and the destination sequential element and/or exclude the intermediate logic instances.

Figure 2:
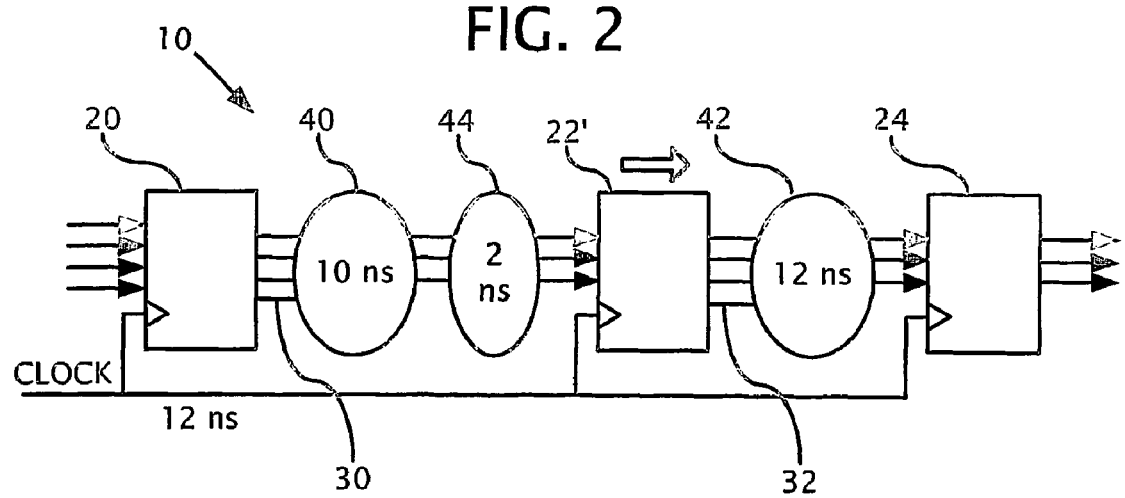
FIG. 2 is a block diagram illustrating an example of forward retiming using the exemplary pipeline of FIG. 1.
Figure 3:
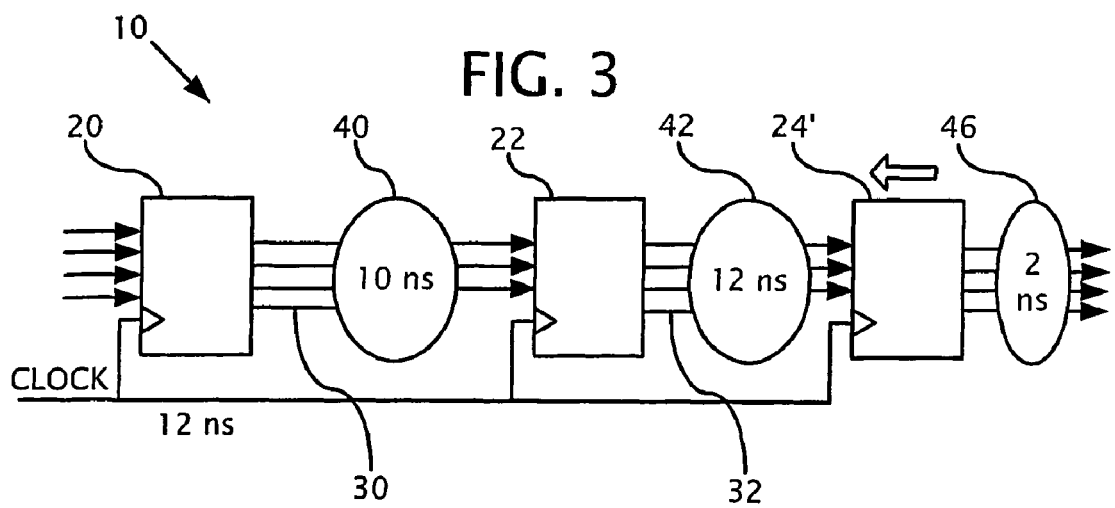
FIG. 3 is a block diagram illustrating an example of backward retiming using the exemplary pipeline of FIG. 1.

FIGS. 1–3 illustrate an example of retiming. In this example, it is assumed that the depicted sequential elements operate with no delay. FIG. 1 shows a pipeline 10 starting at a bank 20 of sequential elements (e.g., flip-flops) and ending at a bank 24 of sequential elements with an intermediate bank 22 of sequential elements in between. During operation, the values in the bank 20 are output to the paths 30 through combinational logic 40 (e.g., a look-up table (LUT) or one or more logic gates) and into the intermediate bank 22. The delay along the various paths 30 through the logic 40 can vary from one path to another. Assume for purposes of this example that the longest delay along at least one of the paths 30 is 10 ns. The delay identified on the combinational logic 40 is equal to the delay of the slowest path or paths (since more than one path may have a 10 ns delay). In the next clock cycle, the values from the intermediate bank 22 are output along various paths 32 through combinational logic 42, which has at least one path having a longest delay of 14 ns, and into the bank 24. As seen in FIG. 1, the clock driving the illustrated pipeline has a clock period of 12 ns. Thus, because the longest path delay of at least one of the paths 32 is 14 ns, at least one of the values on the paths 32 will not reach the inputs of the bank 24 before the next clock cycle. Consequently, the pipeline 10 will not function properly unless this timing variance is corrected or the clock period is slowed. In the situation illustrated in FIG. 1, the paths 32 are said to have a slack value of "−2." More specifically, the slowest path(s) 32 has (have) a slack value of "−2," which indicates that at least one of the paths 32 does not meet its timing requirement by 2 ns.

FIG. 2 illustrates one type of retiming termed "forward retiming." In forward retiming, the path or paths 32 to be retimed are shortened by moving one or more sequential elements forward. As seen in FIG. 2, for instance, the intermediate bank 22' is moved forward by 2 ns by relocating a portion 44 of the combinational logic 42 to the input side of the intermediate bank 22'. Consequently, the maximum delay in the combinational logic 42 is reduced to 12 ns, and the timing requirement of the clock is met. Specifically, after retiming, the paths between the bank 20 and the intermediate bank 22', and the paths between the intermediate bank 22' and the register bank 24 each have a maximum delay of 12 ns, which satisfies the timing requirement of the clock.

FIG. 3 illustrates a second type of retiming termed "backward retiming." In backward retiming, the path or paths to be retimed are shortened by moving one or more sequential elements backward in the pipeline. As seen in FIG. 3, for instance, the register bank 24' is moved backward to reduce the maximum delay on paths through logic 42 to 12 ns by relocating a portion 46 of the combinational logic 42 to the output side of the register bank 24'. Consequently, the timing requirement of the clock is met. Because both forward retiming and backward retiming can affect other signal paths, a retimed path is typically verified to ensure that the adjacent paths continue to satisfy the timing requirement.

During a retiming operation, the initial state of any of the sequential elements that are repositioned may need to be reconfigured. For example, if the retimed sequential element is a flip-flop, the initial state of the flip-flop may have to be changed from RESET to SET, or from PRESET to CLEAR, in order to retain the proper functionality of the retimed circuit. Whether the retimed sequential element needs to be reconfigured can be determined by evaluating the function of the one or more logic instances across which the element is moved. Additionally, there are circumstances when an otherwise valid retiming operation should not be performed because it violates some design rule. As more fully discussed below, for example, many FPGA designs contain blocks of combinational logic that cannot be broken up or that contain an FPGA-architecture design rule that cannot be broken.

Retiming can be performed by analyzing a circuit one logic instance at a time, and by repositioning the sequential elements on an instance-by-instance basis. This technique, however, can be time-consuming and computationally intensive. By contrast, it is possible in many situations to move one or more sequential elements of a circuit across a group of combinational components (i.e., two or more logic instances), thereby allowing for greater retiming opportunities. For purposes of this disclosure, the location or position in the circuit where it is possible to relocate or retime a sequential element is termed a "cut." More specifically, a cut comprises a set of instance pins (e.g., of a logic instance, such as an LUT in an FPGA) where the retimed sequential element can be inserted. Correspondingly, each instance pin in a cut can be referred to as a "cut pin." In the exemplary embodiments described below the cut pins typically comprise input pins of a logic instance. This usage should not be construed as limiting, however, as the described embodiments can be easily modified such that the cut pins comprise output pins of a logic instance or a combination of output pins and input pins. A cut can be termed a "valid cut" if it does not violate any device architecture rules when the retimed sequential element is inserted at the cut (e.g., a cut that does not violate any FPGA-device architecture rules when a register is placed at the cut). Further, a valid cut at which a retimed sequential element can be located without any change in the circuit functionality change is termed a "retimeable cut," and may include additional instance pins where other sequential elements in the circuit need to be repositioned.

One exemplary form of a retimeable cut can be generally characterized as partitioning a logic cone in the integrated circuit into a first (or left) partition and a second (or right) partition and creating a fan-out-free logic cone at one side of the retimed element. In one particular embodiment, a forward-retimeable cut comprises a retimeable cut where there are no fan-outs from the first (or left) partition of the logic cone other than into the cut itself, and where the first (or left) partition is driven by either compatible sequential elements (e.g., equivalent sequential elements) or by constant pins (e.g., constant input/output pins). Similarly, a backward-retimeable cut according to this embodiment comprises a retimeable cut where there are no fanins into the second (or right) partition of the logic cone other than from the cut itself, and where the second (or right) partition drives one or more sequential elements. If a retimeable cut is driven by sequential elements that have one or more fan-outs that do not enter the logic cone, the cut may still be retimeable. In such cases, however, the sequential elements may need to remain in the circuit after retiming to maintain circuit functionality.

FIGS. 4A–4B are schematic block diagrams illustrating examples of cut-based retiming in a logic cone of an integrated circuit. In particular, FIG. 4A shows an exemplary portion 50 of an FPGA that comprises a first bank of registers 52 driving a logic cone 54. In general, the logic cone 54 comprises one or more logic instances (e.g., one or more LUTS) that drive a second bank of registers 56. The first bank of registers 52 is driven by various other circuit components 58. The first bank of registers 52 or the other circuit components 58 may include one or more output paths that drive other circuit components outside of the logic cone 54. However, the logic cone 54 is characterized in that it has no fan-outs to registers besides the second bank of registers 56.

A retimeable cut 60 is schematically shown in FIG. 4A as partitioning the logic cone 54 into a first (or left) partition 64 and a second (or right) partition 66. In the illustrated example, the cut 60 is a forward-retimeable cut. Thus, as is shown in FIG. 4B, a portion 62 of the registers from the first bank of registers 52 is relocated to the retimeable cut 60. The retimed registers 62 are driven by the left partition 64 and drive the right partition 66, effectively reducing the slack between the retimed registers 62 and the second bank of registers 56.

Figure 5:
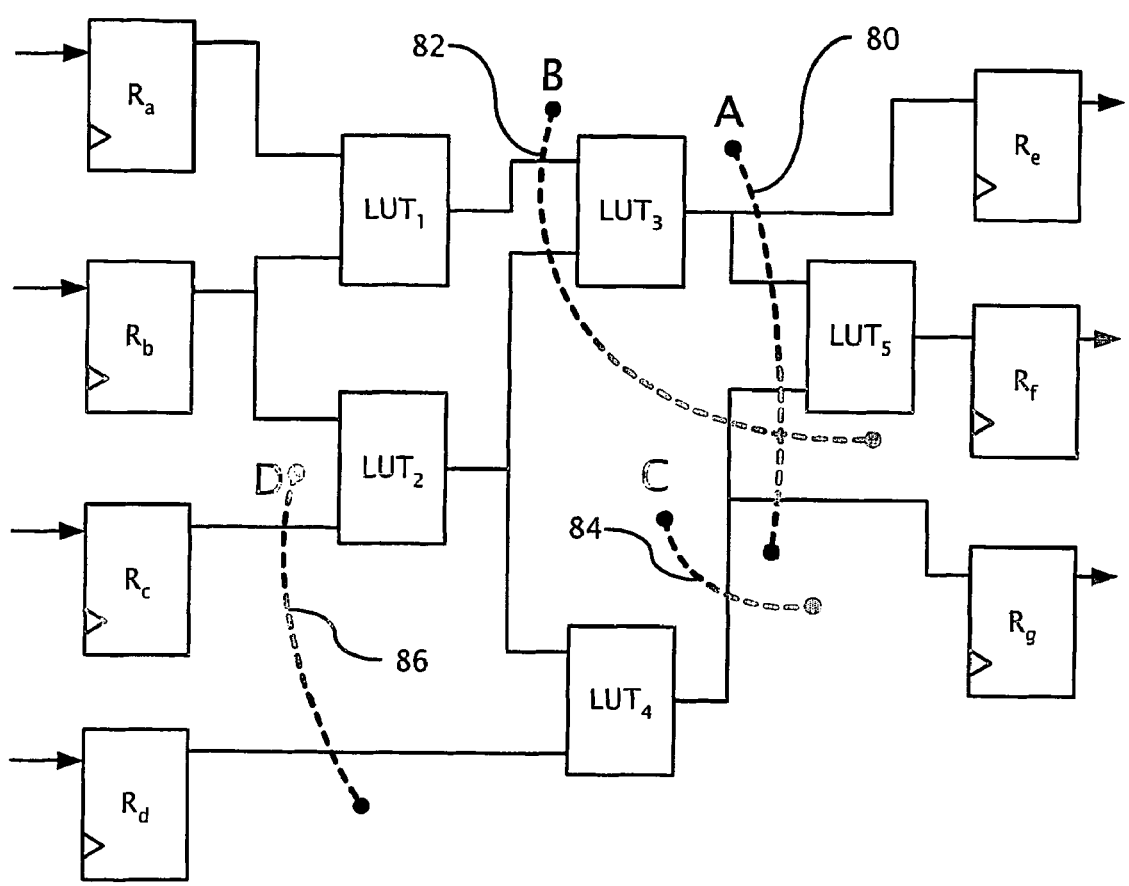
FIG. 5 is a block diagram of an exemplary logic cone in an FPGA and four exemplary cuts in the logic cone.
Figure 6:
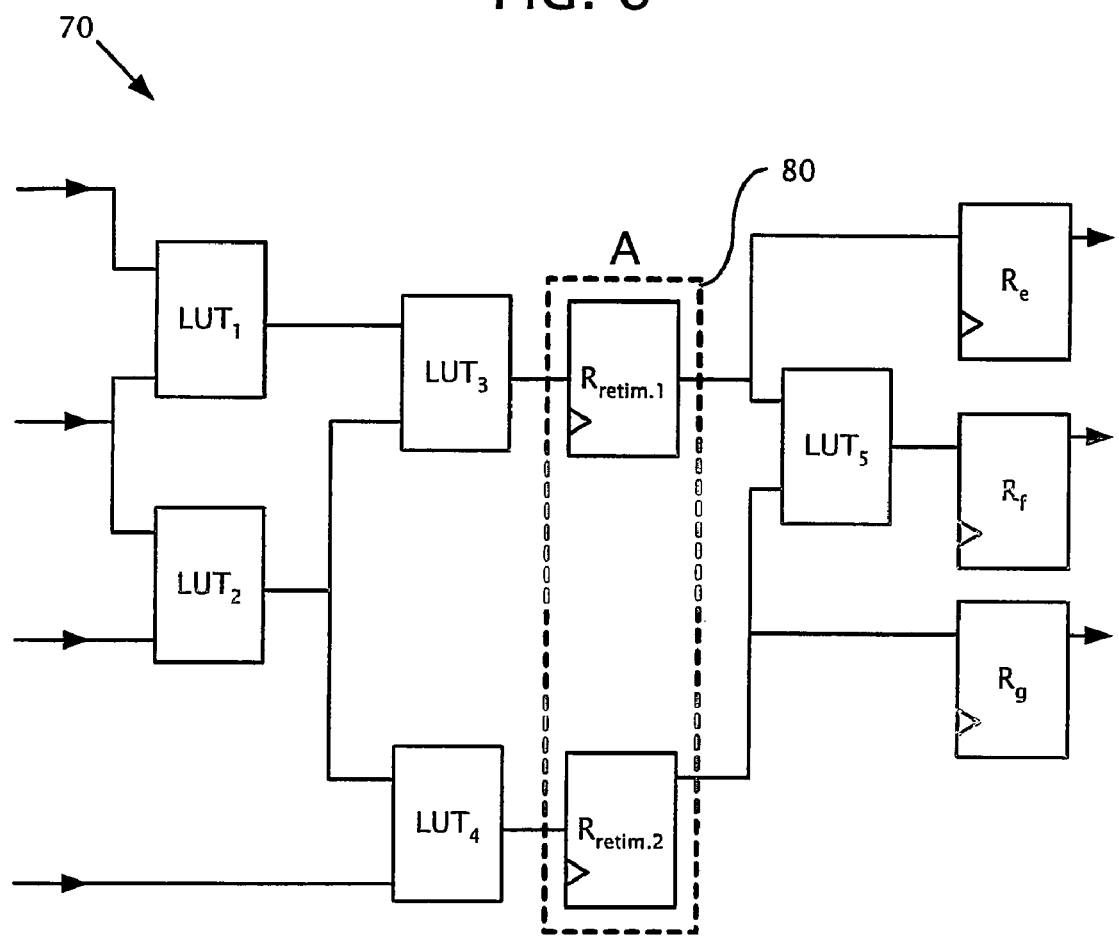
FIG. 6 is a block diagram of the logic cone of FIG. 5 with retimed registers at an exemplary forward-retimeable cut.

FIG. 5 is a schematic block diagram illustrating various types of cuts in an exemplary circuit. In particular, circuit 70 is a portion of a circuit, such as an FPGA, that comprises seven registers $R_a$, $R_b$, $R_c$, $R_d$, $R_e$, $R_f$, and $R_g$ and five look-up tables $LUT_1$, $LUT_2$, $LUT_3$, $LUT_4$, and $LUT_5$. In the illustrated circuit, signals propagate from a first set of registers on the left of the figure ($R_a$, $R_b$, $R_c$, and $R_d$), through the LUTs to a second set of registers on the right of the figure ($R_e$, $R_f$, and $R_g$). The LUTs in FIG. 5 form the logic cone between the first set and the second set of registers. A first cut 80 (labeled as cut "A") allows the forward retiming of $R_a$, $R_b$, $R_c$, and $R_d$ across $LUT_1$, $LUT_2$, $LUT_3$, and $LUT_4$. In particular, the cut 80 in this example is retimeable because there are no fan-outs between the cut and the registers $R_a$, $R_b$, $R_c$, and $R_d$. (It should be noted that retiming may be accomplished even if the registers have fan-outs before their output signals enter the logic cone at the first LUT. In this situation, however, the sequential elements may need to remain in the circuit after retiming to maintain circuit functionality.) FIG. 6 is a schematic block diagram of the circuit 70 after the registers $R_a$, $R_b$, $R_c$, and $R_d$ have been relocated to the retimeable cut 80. The retimed registers $R_{retim.1}$, $R_{retim.2}$ are shown at cut 80 (marked as "A"). As can be seen from FIG. 6, when the circuit 70 is retimed using the forward-retimeable cut 80, the number of registers used to drive the logic cone is reduced from four to two. Depending on the function of $LUT_1$, $LUT_2$, $LUT_3$, and $LUT_4$, the initial states of the two retimed registers may have to be adjusted in order to maintain functional equivalence in the circuit 70.

Figure 7:
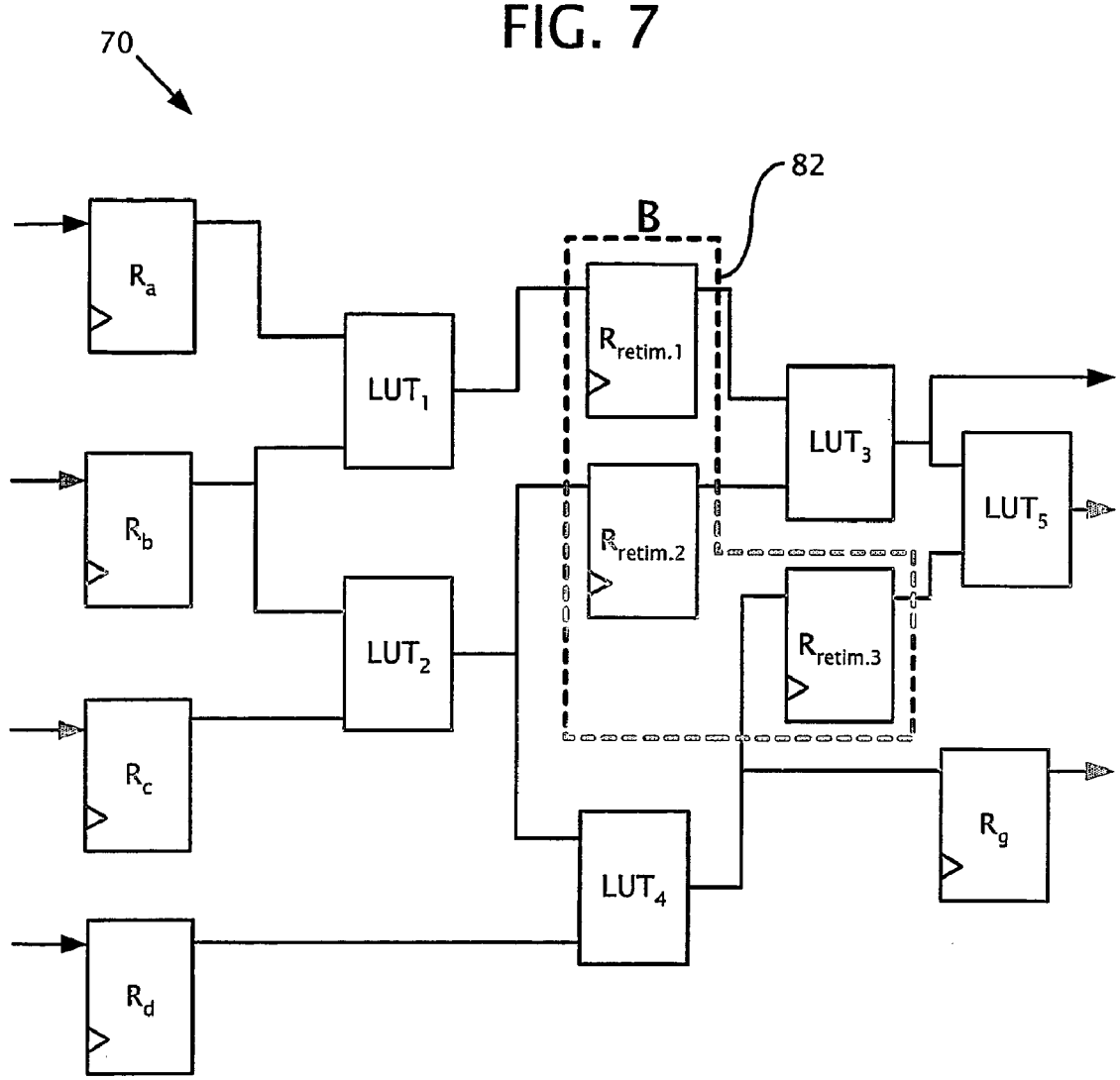
FIG. 7 is a block diagram of the logic cone of FIG. 5 with retimed registers at an exemplary backward-retimeable cut.

Returning to FIG. 5, a second cut 82 (labeled as cut "B") allows the backward retiming of registers $R_e$ and $R_f$ across $LUT_3$ and $LUT_5$. In particular, the cut 82 is retimeable because there are no fanins into the logic cone between the cut and the registers $R_e$ and $R_f$. FIG. 7 is a schematic block diagram showing the circuit 70 after the registers $R_e$ and $R_f$ have been relocated to the retimeable cut 82. As seen in FIG. 7, registers $R_e$ and $R_f$ are replaced by three retimed registers $R_{retim.1}$, $R_{retim.2}$, and $R_{retim.3}$ located along the cut 82 (marked as "B" in FIG. 7). Depending on the function of $LUT_3$ and $LUT_5$, the initial states of the retimed registers may have to be adjusted in order to maintain functional equivalence in the circuit 70.

Returning to FIG. 5, a third cut 84 (labeled as cut "C") represents an invalid cut in this example for forward retiming. Namely, the third cut 84 is impermissible because there are fan-outs between the cut and the registers to be retimed. In particular, register $R_b$ fans out to $LUT_1$, and $LUT_2$ fans out to $LUT_3$, which are signals that are not included in the third cut 84.

A fourth cut 86 (labeled as cut "D") represents an invalid cut in this example for backward retiming. The fourth cut 86 is impermissible because there are several fanins into the logic between the cut and the registers to be retimed. In particular, $LUT_2$ has an input path from $R_b$ and $LUT_5$ has an input path from $LUT_3$, which is driven by signals from registers $R_a$ and $R_b$, that are not included in the cut.

In general, there are several types of constraints that can be considered during any of the disclosed retiming operations. Among the constraints to be considered are: timing constraints, architectural constraints, and structural constraints. Timing constraints include design constraints that require paths of the design to have a maximum and/or a minimum delay. The required delay may be dictated by the cycle period of the associated clock signal or be explicitly defined by the designer. A path may have no timing constraint (sometimes referred to as a "false path") or may have overlapping constraints, such as when a particular path is coupled to multiple clock domains. Another type of timing constraint may be the requirement that the number of sequential elements used to perform the retiming operation is less than or equal to the number of original registers. This constraint may be desirable, for instance, if the retiming operation is used to reduce the overhead used by sequential elements in a design.

Figure 8:
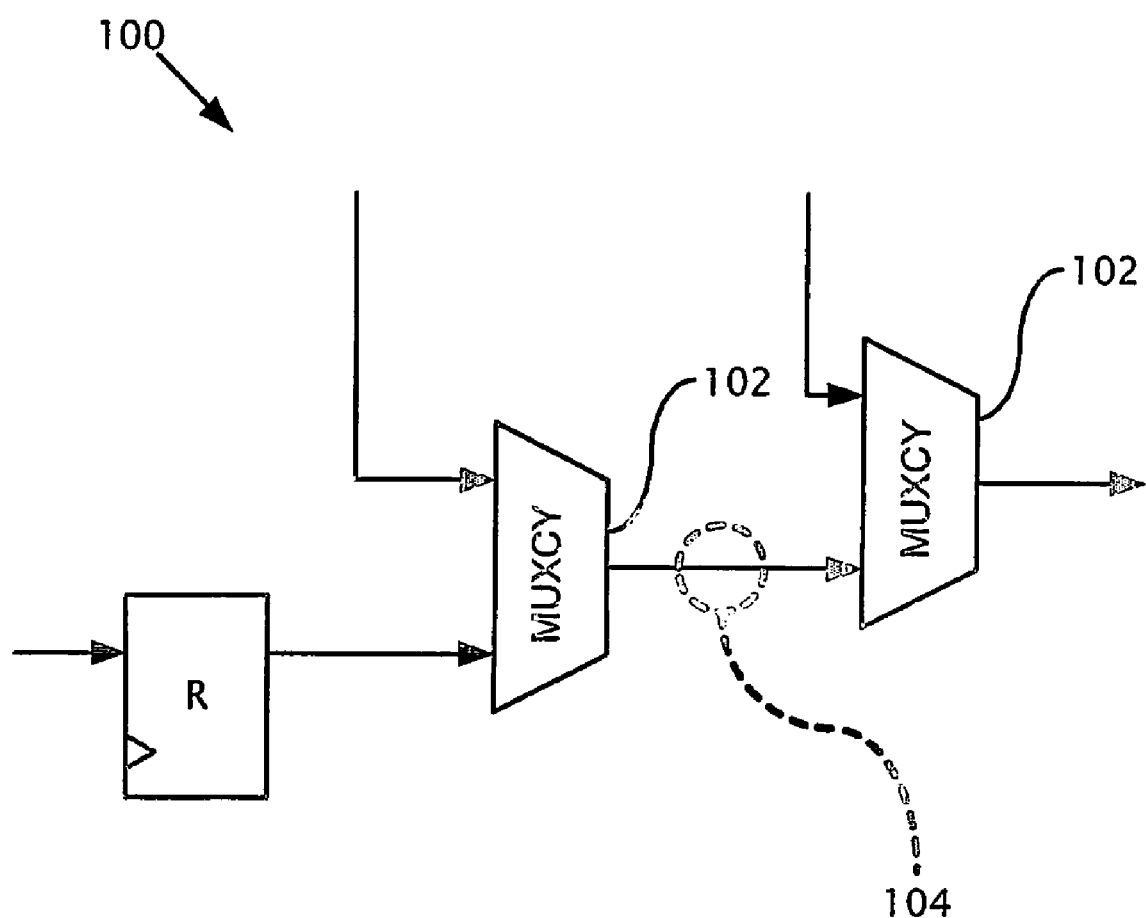
FIG. 8 is a block diagram illustrating an exemplary architectural constraint in an FPGA.

Architectural constraints are constraints presented by the particular design of the integrated device being retimed. For example, for FPGAs, registers are typically pre-fabricated and positioned at certain locations. Thus, retiming cannot move registers to a location other than those already determined. Moreover, certain paths or circuit components are prefabricated and cannot be broken up during retiming. For instance, in the Virtex-II® FPGA manufactured by Xilinx®, a configurable logic block (CLB) uses some LUTs and two 2-to-1 multiplexers (MUXF5 and MUXF6) to implement an eight-to-one multiplexer. In the architecture, it is not permissible to insert a register between the MUXF5 and MUXF6 multiplexers. FIG. 8 shows another example of a portion of the Virtex-II® architecture that cannot be retimed. In particular, FIG. 8 shows a carry chain 100 of an adder circuit implemented using two 2-to-1 multiplexers 102 (MUXCY), which are used to perform high-speed 1-bit carry propagate functions. Also shown in FIG. 8 is an illegal location 104 for locating a retimed register according to the Virtex-II® FPGA architecture rules. If a register were to be placed in the illegal location, it would break the carry chain and result in a significant increase in delay as the fast local connection would no longer be able to be used.

Certain constraints may be relaxed by logic and/or placement transformations. For instance, with respect to the first example discussed above, the MUXF6 multiplexer can be implemented in a separate slice of the FPGA as a LUT, thereby allowing a register to be inserted between the MUXF5 and the LUT. Although this type of transformation may allow for improved retimeability, it may disrupt the overall placement of circuit components and have an overall negative impact on timing performance. Thus, in certain embodiments of the disclosed technology, logic and/or placement transformations are considered only if the circuit cannot be retimed using the existing valid locations for retimeable cuts. After any such transformation, it is often desirable to verify the operation of the circuit using a physical timing analysis tool (e.g., an incremental timing analysis tool). The examples recited above are for illustrative purposes only and should not be construed as limiting in any way. Indeed, the type and quality of the architectural constraint varies depending on the particular circuit being analyzed for retiming purposes.

Structural constraints typically result from the net-list structure, which may produce circuit components that restrict retimeability when implemented in a circuit. For example, if registers have unequivalent control signals, retiming operations may be hindered. In order to overcome such constraints, however, the control signals may, in some instances, be separated from the registers, thereby making the registers equivalent and retimeable. Several examples of control-signal separation are discussed below with respect to FIGS. 9–12. These examples should not be construed as limiting, however, as additional methods of signal separation are possible utilizing any of the principles exemplified in the discussion below.

Figure 9A:
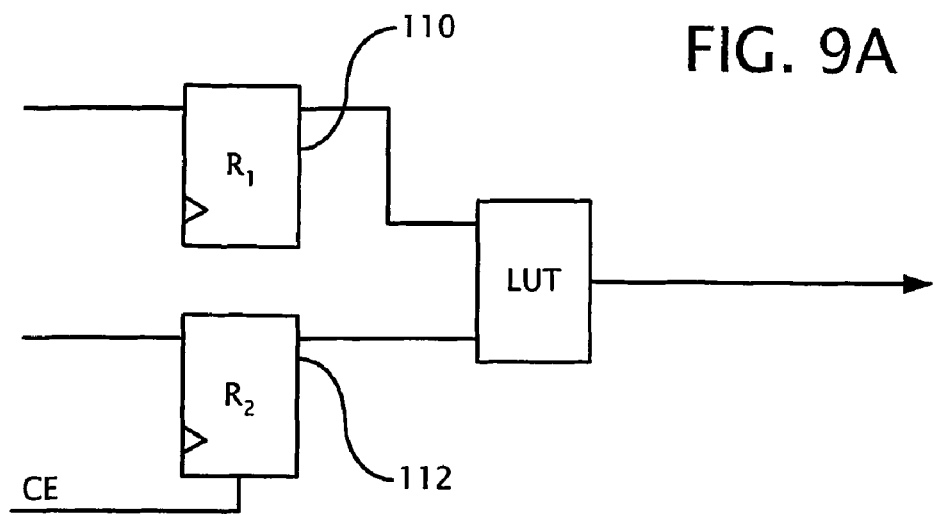
FIGS. 9A–9C are block diagrams illustrating a first exemplary process of control-signal separation as may be used during retiming.
Figure 9B:
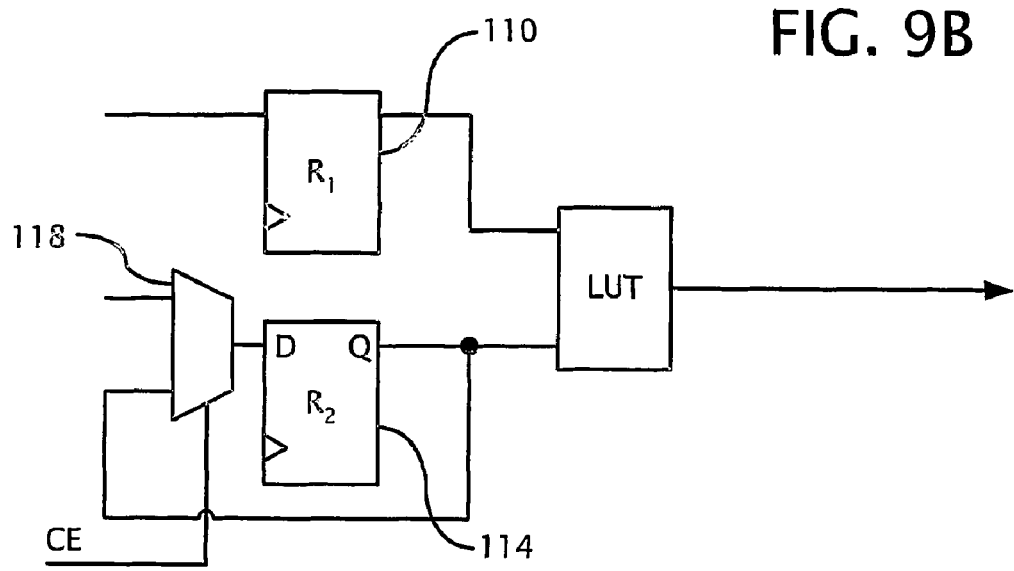
Figure 9C:
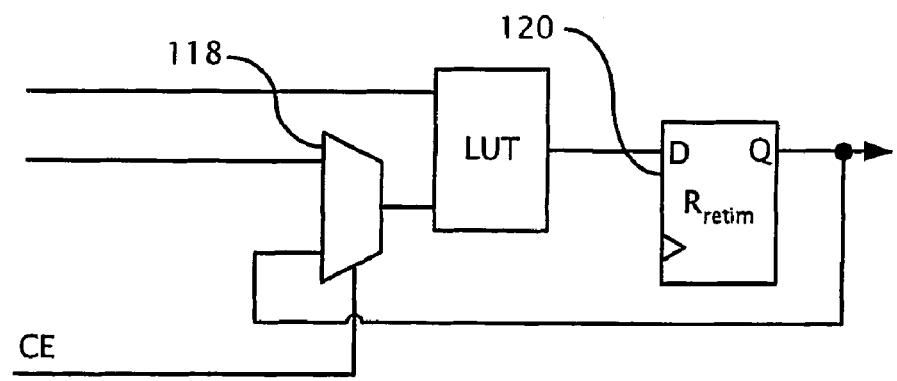

First, consider two registers of an FPGA as shown in FIG. 9A. A first register 110 is an ordinary D-type flip-flop driven by a clock signal (not shown). A second register 112 is a D-type flip-flop that includes a clock-enable signal (CE). Because the first register 110 has no control signal whereas the second register 112 does, the two registers are not equivalent. As seen in FIG. 9B, a transformation can be performed on the second register 112 that separates the clockenable signal from the second register. Specifically, a multiplexer 118 controlled by the clock-enable signal can be used to loop the Q signal back from a register 114, which comprises an ordinary D-type flip-flop without a clock-enable signal, in order to create a register structure functionally equivalent to the original register 112. Once this transformation is performed, in this example, the registers can be retimed. The resulting retimed circuit is shown in FIG. 9C and includes a single retimed register 120, which has a feedback path to the multiplexer 118. Functionally, the circuits of FIG. 9A and FIG. 9C are identical.

Figure 10A:
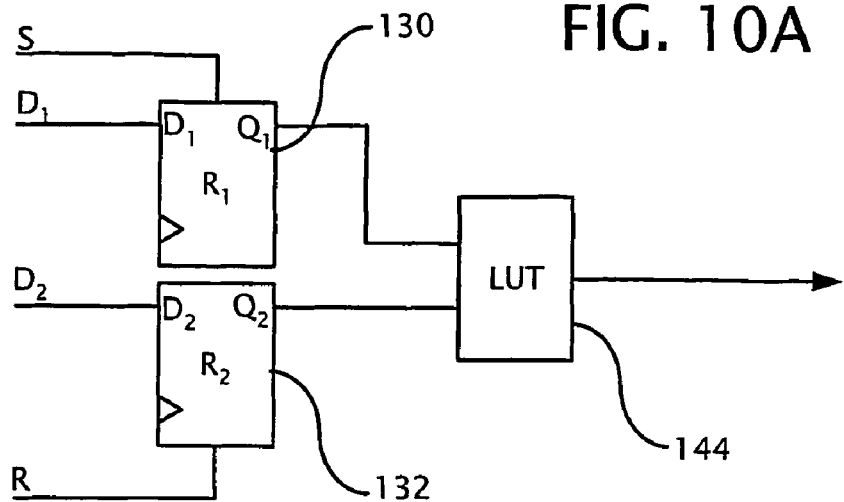
FIGS. 10A–10C are block diagrams illustrating a second exemplary process of control-signal separation as may be used during retiming.
Figure 10B:
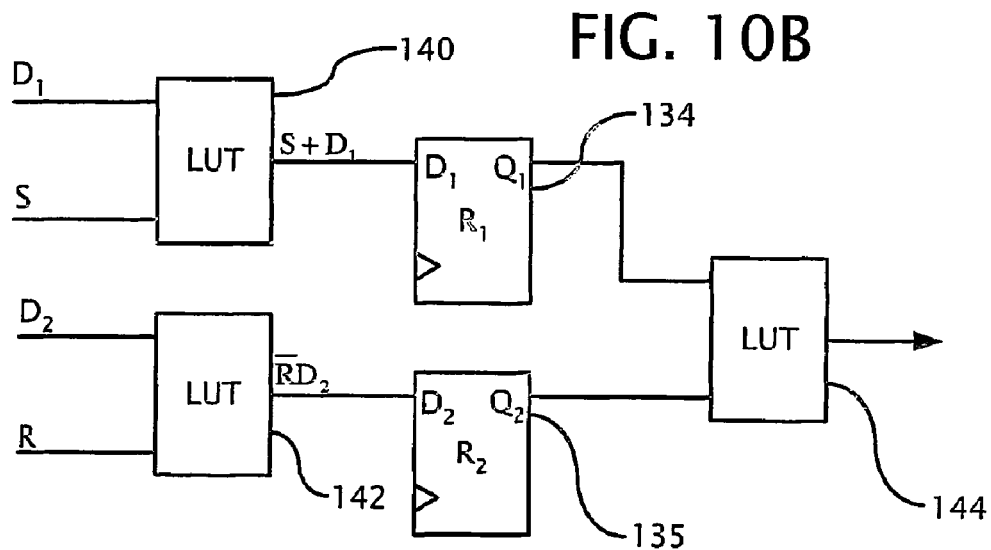
Figure 10C:
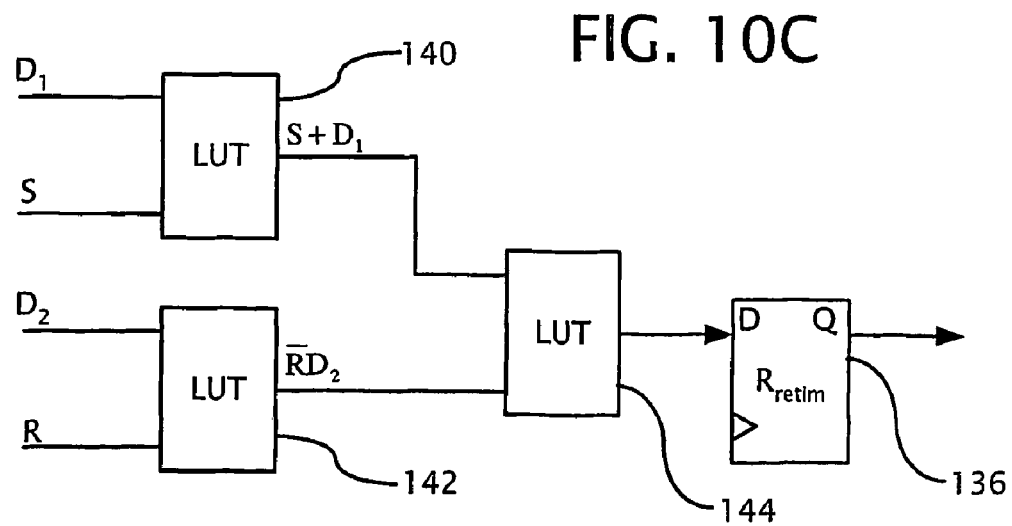

Next, consider two registers of an FPGA as shown in FIG. 10A. Register 130 is a single D-type flip-flop with a synchronous set input (e.g. a Xilinx® FDS register) and register 132 is a single D-type flip-flop with a synchronous reset input (e.g., a Xilinx® FDR register). In FIG. 10A, registers 130, 132 are activated by the same clock (not shown). The set and reset signals of the register 130, 132 can be separated as shown in FIG. 10B such that two equivalent registers 134, 135 can be used in place of the registers 130, 132. In particular, the separation of the set signal from the register 130 can be accomplished by implementing a logic instance 140 (e.g., a logic gate or LUT, as shown) upstream of the register 134 that performs the logic function $D_1+S$ on the input signals $D_1$ and S. The resulting output from the logic instance 140 is equivalent to the operation of the register 130, and allows the register to be reimplemented as an ordinary D-type flip-flop (e.g., a Xilinx® FD register). Similarly, the reset signal from the register 132 can be separated by implementing a logic instance 142 that performs the logic function $\overline{R}D_2$ on the inputs signals $D_2$ and R. As shown in FIG. 10C, the resulting equivalent registers 134, 135 can be retimed as retimed register 136 across the logic instance 144.

In some situations, it may not be necessary to separate control signals from the registers of a design. For example, if the set and reset signals of the register 130, 132 are the same, the two registers can be forward retimed by calculating the proper register initial state with respect to the function of the logic instance 144. For instance, if the logic instance performs an OR function, and if the registers 130, 132 have initial states of 1 and 0, respectively, then the initial state of the retimed register 136 should be 1.

Figure 11A:
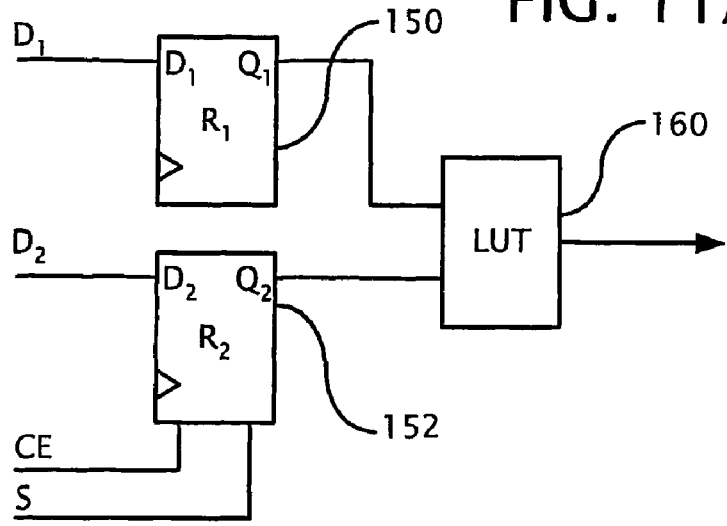
FIGS. 11A–11C are block diagrams illustrating a third exemplary process of control-signal separation as may be used during retiming.
Figure 11B:
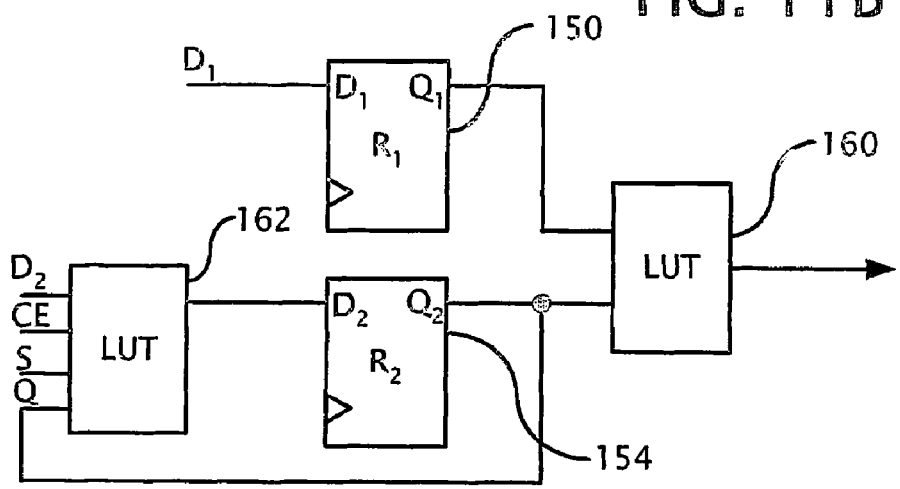
Figure 11C:
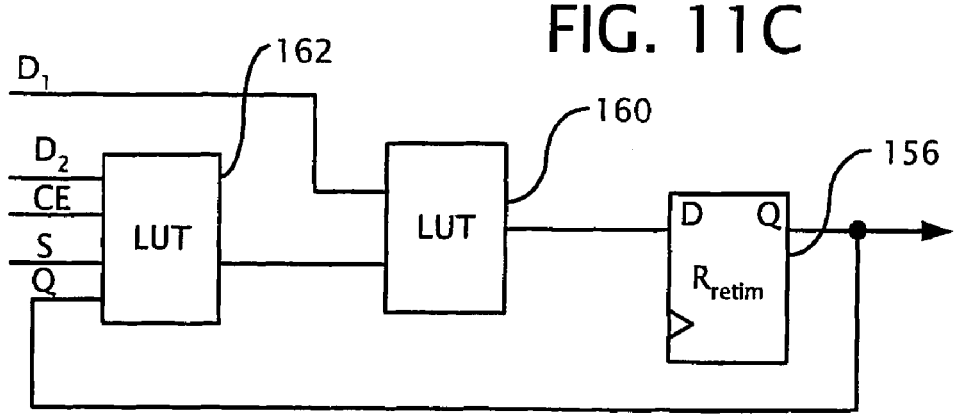

Next, consider the registers of an FPGA shown in FIG. 11A. Register 150 comprises a D-type flip-flop and register 152 comprises a D-type flip-flop with a clock-enable signal (CE) and a synchronous-set signal (S) (e.g. a Xilinx® FDSE register). As shown in FIG. 11B, both the clock-enable and synchronous-set signals can be replaced with a D-type flip-flop 154 and a 4-input logic instance 162 (e.g., a 4-input LUT). In particular, the 4-input logic instance 162 performs the logic function $(CE)D_2+(\overline{CE})Q+S$, where Q is the output from the register 154. As shown in FIG. 11C, the registers 150 and 154 can then be retimed across the logic instance 160 as retimed register 156. As stated earlier, these transformations can be used when needed to make a cut retimeable. In one embodiment, the transformations are used only when placement is possible and the impact on timing is positive.

Structural constraints can often be relaxed using other methods as well. For example, when it is desirable to backward retime a register over a logic instance that has one output driving a register and another output that does not, a replication of the logic instance can be created to carry the output that is not driving the register. Thus, the original logic instance will only have an output that drives a register, and can, in this example, be retimed. Such transformations alter the combinational logic netlist, however, and may negatively impact the overall circuit design. Therefore, in any of the embodiments disclosed herein, any such transformation can be performed only when it has a verified positive impact.

Figure 12:
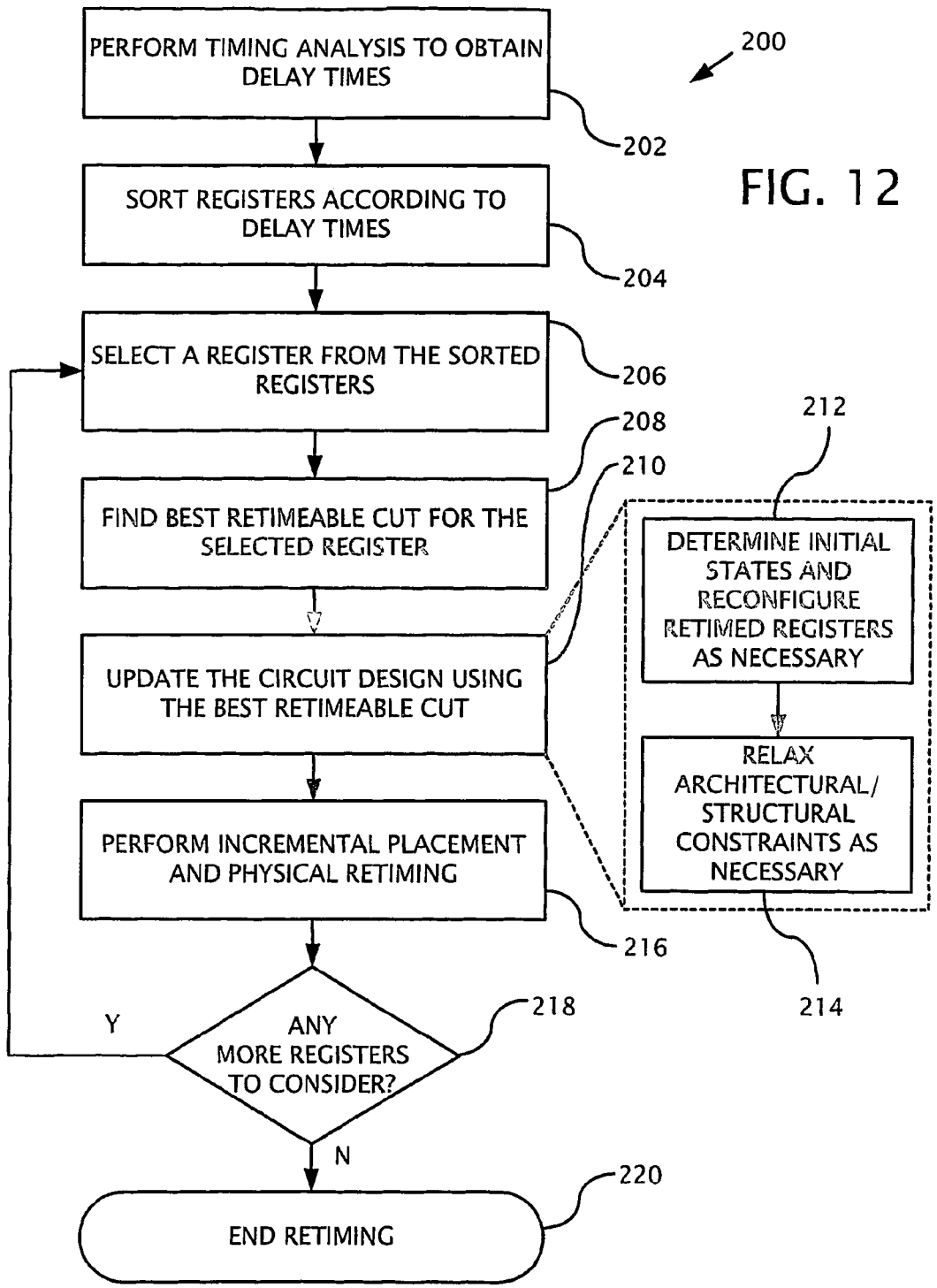
FIG. 12 is a flowchart illustrating an exemplary method for retiming an integrated circuit.

The flowchart of FIG. 12 shows an exemplary method 200 for retiming a circuit using retimeable cuts. Although not required, the exemplary method 200 is desirably performed after the initial placement and routing. Although reference is made to an FPGA, the exemplary method shown in FIG. 12 can be used to retime any suitable circuit (e.g., an ASIC, SOC, or other such device containing retimeable sequential elements and having similar timing limitations). Moreover, even though the exemplary method shown in FIG. 12 is described with reference to the retiming of registers, the method also can be applied generally to any retimeable sequential element of a circuit (e.g., latches, etc.).

At process block 202, a timing analysis is performed on one or more paths of an integrated circuit to obtain delay times. This timing analysis is desirably performed using a versatile timing analysis engine that is capable of handling timing constraints present in real circuit designs. For example, in one exemplary embodiment, the SST Velocity® timing-analysis engine available from Mentor Graphics Corporation® is used. In one particular embodiment, the timing analysis engine is capable of performing incremental analysis, which allows a designer or user to analyze and evaluate timing changes to a particular area of the circuit design (e.g., a particular logic cone) without having to calculate the timing of the entire circuit. In one embodiment, the timing analysis includes calculated slack values for the one or more paths.

At process block 204, the registers of the circuit are sorted according to the delay times obtained at process block 202. According to one embodiment, the slack values of the paths are used to sort the registers. In one particular implementation, for example, the slack value associated with a register corresponds to the worst slack time in a path driven by the register. According to this embodiment, for example, if a register drives three paths having slack values of −3, −1 and 2 ns, the register will be deemed to have a slack value of −3 ns. In certain embodiments, process block 204 is not performed.

At process block 206, a register is selected from the registers sorted at process block 204. This selection can be made based on a number of different criteria. In one exemplary embodiment, for instance, the register having the most negative slack value is selected. This register may correspond to the first register from the list of sorted registers.

Figure 14:
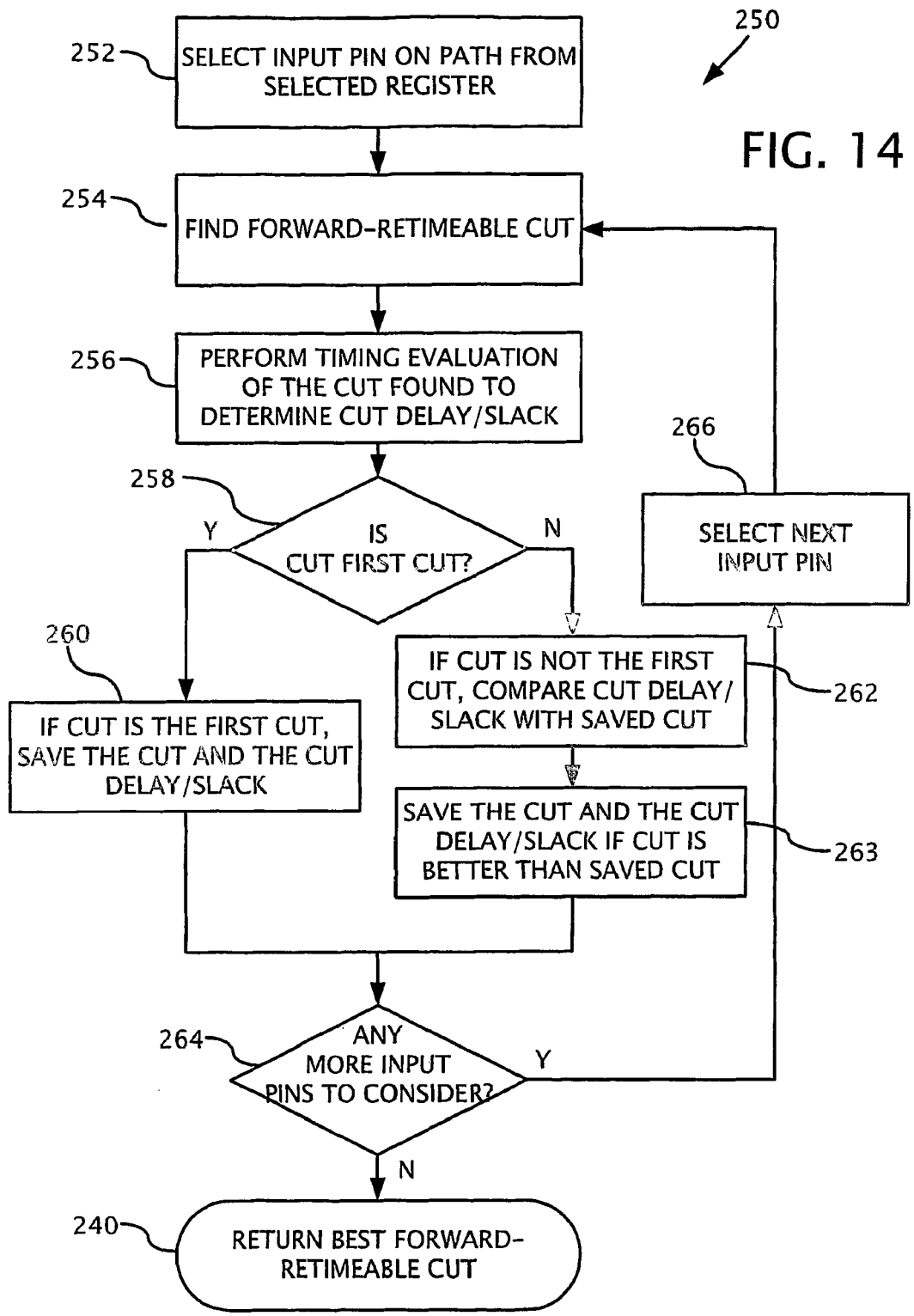
FIG. 14 is a flowchart illustrating an exemplary method of determining a best forward-retimeable cut as may be used in the method illustrated in FIG. 12.
Figure 15:
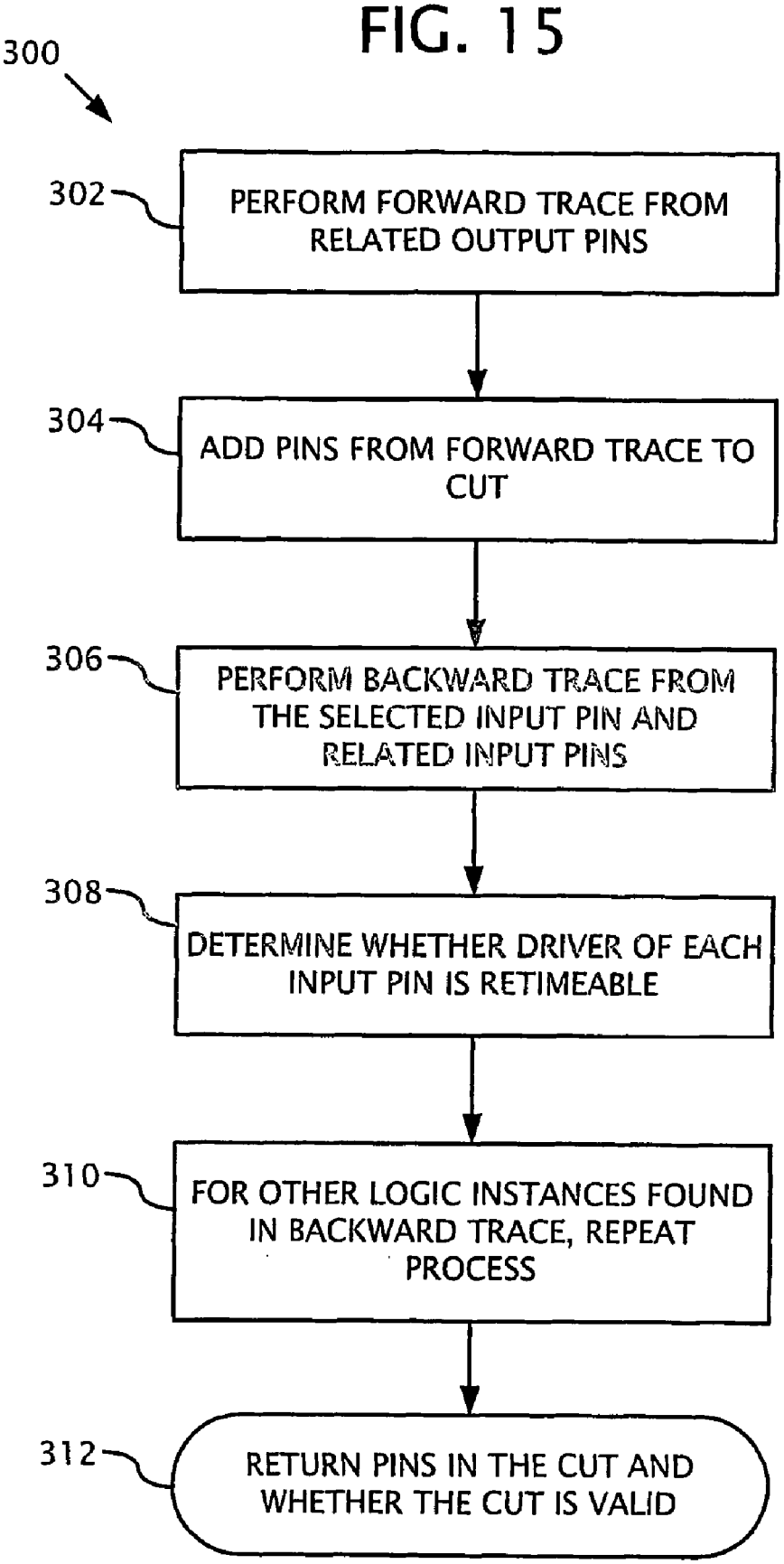
FIG. 15 is a flowchart illustrating an exemplary process of finding a forward-retimeable cut by forward tracing and backward tracing from a selected input pin.
Figure 18:
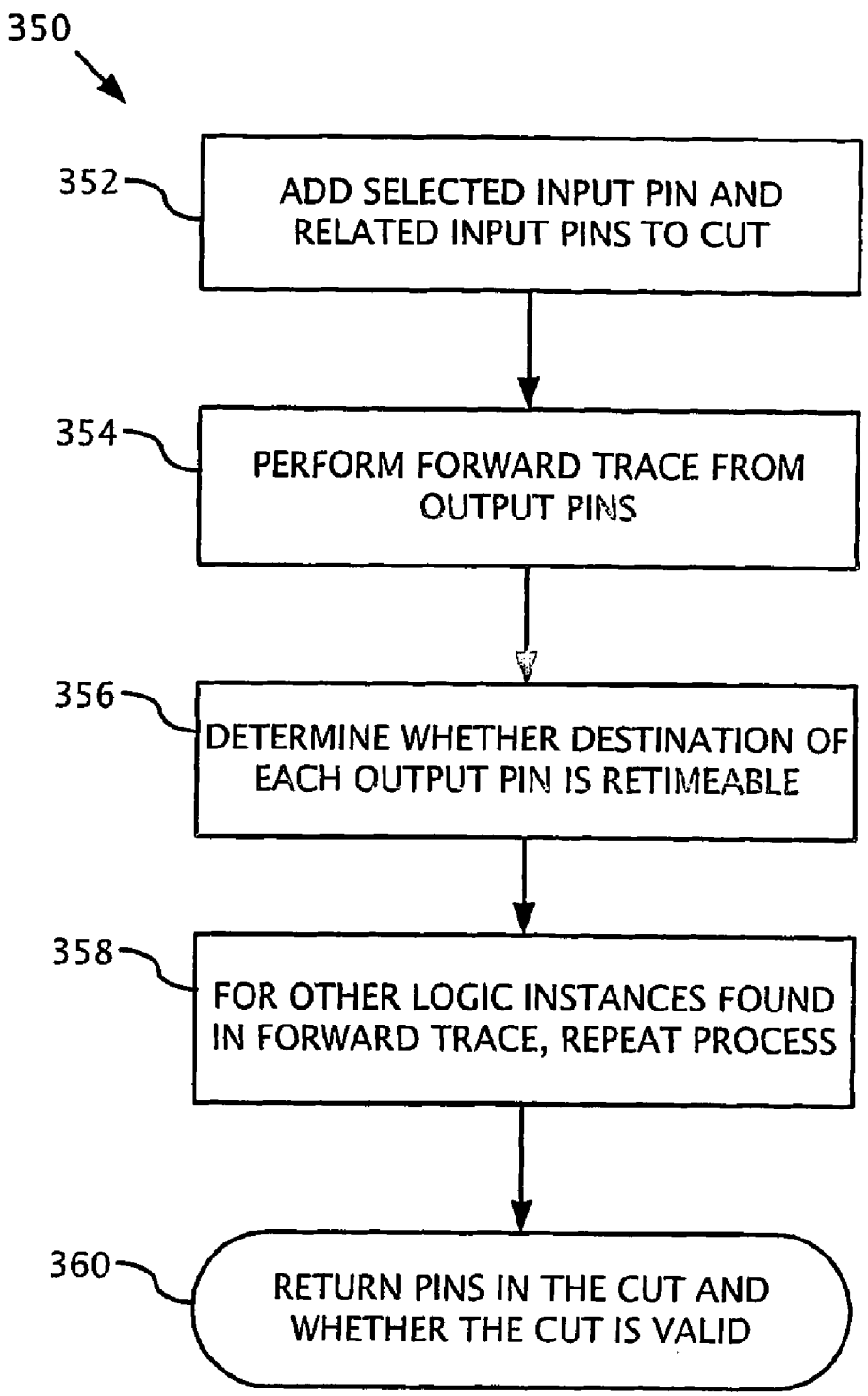
FIG. 18 is a flowchart illustrating an exemplary process of finding a backward-retimeable cut by forward tracing and backward tracing from a selected input pin.

At process block 208, the best retimeable cut for the selected register is found. To find the best retimeable cut, a search can be performed for forward-retimeable cuts, backward-retimeable cuts, or a combination of both. An exemplary method for finding the best forward-retimeable cut is illustrated in FIGS. 14 and 15 and discussed more fully below. An exemplary method for finding the best backward-retimeable cut is illustrated in FIG. 18 and discussed more fully below.

Figure 13:
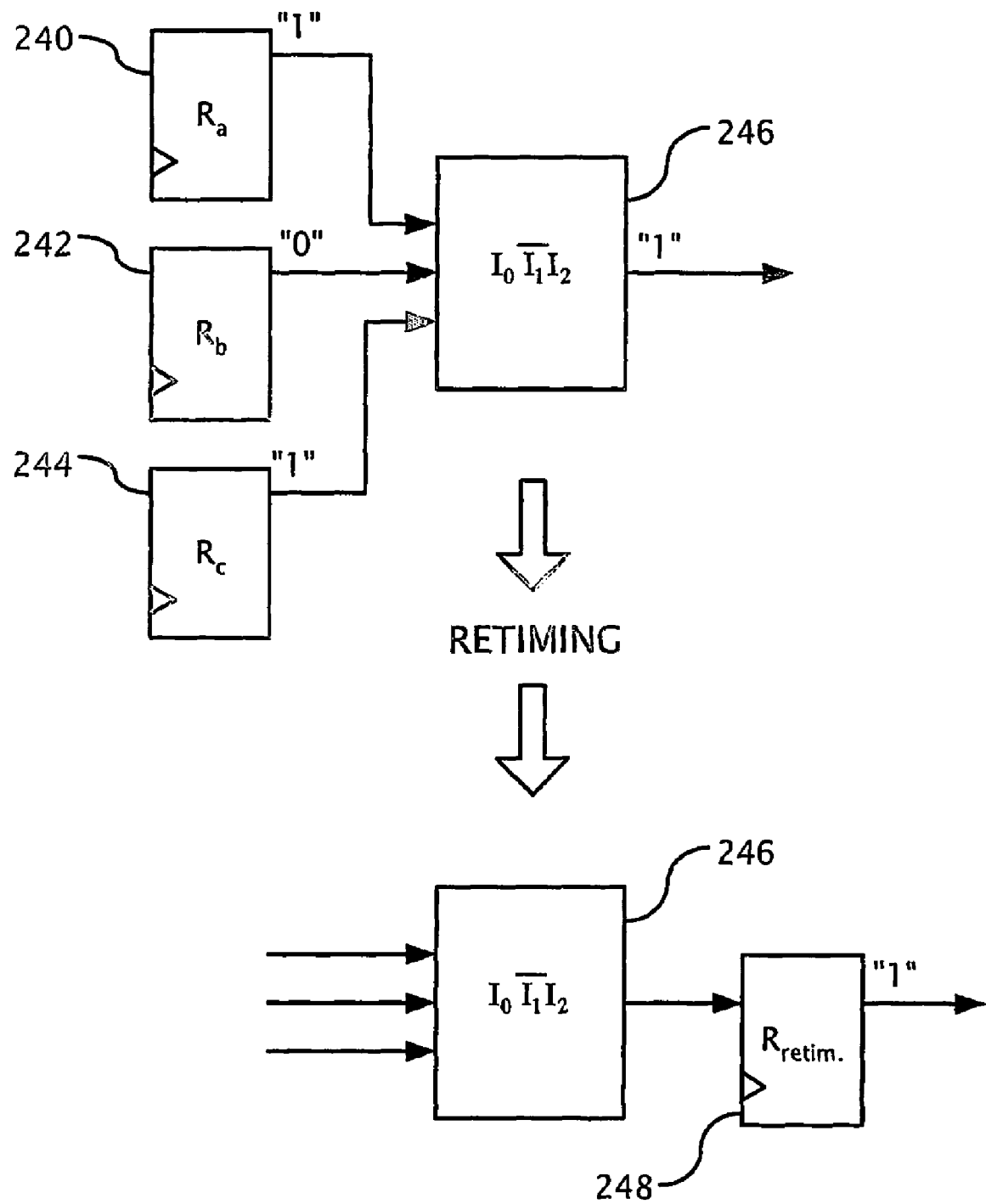
FIG. 13 is a block diagram illustrating an exemplary process of finding the retimed initial state of three registers being retimed.

At process block 210, the circuit design is updated (or modified) to include the best retimeable cut. Specifically, in the updated circuit design, the selected register and any other register included in the best retimeable cut are repositioned. In some embodiments, and as shown at process block 212, this process of updating may include determining and reconfiguring the initial states of the retimed registers in order to retain circuit functionality. For example, FIG. 13 shows the initial states of three registers 240, 242, 244 before they are retimed. Register 240 ($R_a$) is set initially, register 242 ($R_b$) is reset, and register 244 ($R_c$) is set. Also shown in FIG. 13 is an exemplary logic instance 246 (e.g., a LUT) that performs the logical function $I_0\overline{I_1}I_2$. When the registers are in their initial state, the output of the logic instance 246 is high. After retiming, the three registers are removed and replaced by a forward-retimed register 248 ($R_{retim'}$). The retimed register 248, which is located at the output of the logic instance 246, should be configured to have a "set" initial state so that the same value is propagated downstream of the logic instance 246 as was propagated before retiming. The exemplary techniques described in V. Singhal, M. Sharad, and R. Brayton, "The Case for Retiming with Explicit Reset Circuitry," *Proc. of Intl. Conf. on Computer-Aided Design* (November 1996), which is hereby incorporated by reference, can be used to calculate the initial states.

Returning to FIG. 12, and as shown at process block 214, updating the circuit design may additionally comprise relaxing architectural/structural constraints. As discussed more fully above, relaxing architectural/structural constraints can comprise separating control signals from certain sequential elements in order to make them equivalent and therefore retimeable.

At process block 216, incremental placement and physical retiming are performed. Retiming should desirably result in as little disturbance to the original placement as possible. In certain embodiments, some overlapping of instances at the same physical location may be allowed during retiming. In these embodiments, timing-driven incremental placement may be used to remove all the overlaps after retiming. During incremental placement, it is desirable, though not necessary, to place retimed registers close to the cut pins in order to avoid unexpectedly long interconnect delays. In one exemplary embodiment, a timing analyzer capable of accounting for interconnect delay and of building a physical-delay model rather than a wire-load delay model is used during physical retiming.

During incremental placement, a determination can be made as to whether the retimed registers are "placeable." That is, a determination can be made as to whether any architectural rules of the integrated circuit (e.g., an FPGA) are violated if a retimed sequential element is placed at a specific location. For example, a single slice of a particular FPGA architecture may be able to hold two or more registers but have only one signal line to connect the clock enable pin to its outside connection. Thus, if one register with a clock-enable signal has already been placed into the slice and a new register having a clock-enable signal is to be placed into the slice, then the clock-enable signals of the two registers must be the same. Otherwise, placement and routing may not be possible.

During incremental placement, the overall congestion caused by the retiming operation can also be evaluated. For example, if a large retimeable cut is found during backward retiming, many new registers may need to be created and placed around the cut location. Because the number of new registers may create too much congestion in the circuit (e.g., based on the design of the FPGA, some preset number of allowable registers, or some other criteria), the retiming at the cut may be rejected.

At process block 218 of FIG. 12, a determination is made as to whether there are any more registers to consider (e.g., any more registers having negative slack times). If so, the process 200 is desirably repeated from process block 206 for the next register (e.g., from the sorted list or as identified during physical retiming at process block 216). Otherwise, the retiming process 200 ends at process block 220.

An exemplary process 250 for finding a best forward-retimeable cut is illustrated in FIG. 14. This process can be used, for example, as at least part of the process of finding the best retimeable cut at process block 208 of FIG. 12. According to the illustrated embodiment, the process 250 is performed for the path from the selected register having the largest negative slack time. This path is sometimes referred to herein as the "failing path." At process block 252, a first pin of a logic instance along the failing path is selected. According to one embodiment, the first pin is the input pin of the first logic instance along the failing path originating at the selected register. Using the selected pin, a forward-retimeable cut is found at process block 254. An exemplary method of finding the forward-retimeable cut is discussed below with reference to FIG. 15. At process block 256, an incremental timing evaluation of the forward-retimeable cut found is performed to determine the new delay times and/or slack values that result from the cut. At process block 258, a determination is made as to whether the cut is the first cut found in the method 250. If the cut is the first cut found, then the cut is saved at process block 260. If the cut is not the first cut found, then at process block 262, the delay times and/or slack times of the current cut are compared with the delay times and/or slack times of the saved cut. If the times of the current cut are better than the saved cut (e.g., as determined by the overall reduction in time along the failing path), then at process block 263, the current cut is saved and replaces the previously saved cut. Alternatively, plural cuts may be saved for subsequent evaluation. For example, two or more cuts may result in satisfactory slack improvement, but one cut may be easier to implement even though the slack improvement is not as great. In this case, the most desirable cut may be deemed to be the best cut, even though it does not achieve the best timing performance. More typically, however, the best cut is deemed to be the cut that provides the greatest timing improvement. At process block 264, a determination is made as to whether there are any more input pins to consider along the failing path. For example, in one embodiment, the instance pins along the failing path are considered sequentially from the source sequential element to the destination sequential element of the path. If there are additional pins to consider, then the next pin is selected at process block 266 and the method 250 is repeated from process block 254. If there are no more additional pins to consider, then the method 250 terminates at process block 268 and the best forward-retimeable cut is returned. The process of finding the best backward-retimeable cut is similar to that described above, except that backward-retimeable cuts are found (process block 254) and evaluated (process blocks 256 through 264). In one exemplary embodiment, the process for finding the best backward-retimeable cut begins at the input pins of the last logic instance along the failing path and proceeds sequentially toward the first logic instance in the failing path. An exemplary method for finding a backward-retimeable cut is discussed below with respect to FIG. 18.

An exemplary method 300 for finding a forward-retimeable cut as may be used at process block 254 of FIG. 14 is shown in FIG. 15. In general, the method 300 traces the paths of the logic cone forward and backward from the logic instance associated with the selected input pin. This process of forward and backward tracing helps identify and evaluate other sequential elements that need to be retimed in order to retain circuit functionality. The process also helps ensure that any cut found is valid. For example, for a forward-retimeable cut, the process of backward tracing is useful to confirm that there are no fan-outs from the first (or left) partition of the logic cone and that the first (or left) partition of the retimeable cut is driven by compatible sequential elements or constant output pins.

At process block 302 of FIG. 15, a forward trace is performed from the output pins of the logic instance related to the selected input pin. For example, if an input pin of an LUT performing an AND function is selected, then all paths driven by the output pin(s) of the LUT will be traced. In general, a "forward trace" refers to the process of identifying the input pins driven by a particular output. The relevant input pins may be identified, for example, from the netlist or other design database storing the circuit design (e.g., a VHDL or Verilog file). At process block 304, the input pins identified at process block 302 are added to the cut. At process block 306, backward tracing is performed. In one embodiment, backward tracing is performed from all of the input pins of the logic instance related to the selected input pin, including the selected input pin itself. Similar to forward tracing, a "backward trace" refers to the process of identifying the output pins driving a particular input pin as well as identifying other input pins being driven by those output pins identified. For each of the output pins (i.e., drivers) identified during the backward trace, a determination is made at process block 308 as to whether the driver is retimeable. In one embodiment, for example, a driver is retimeable only if it is a sequential element, a constant input/output pin, or another logic instance. If the driver is a sequential element, the sequential element can be evaluated to determine whether it is equivalent or can be reconfigured to be equivalent (e.g., by removing control signals as discussed above) to the relevant retimed register. If the driver is a logic instance, an evaluation can be performed to determine whether the drivers of the logic instance are retimeable. If the driver is not capable of being retimed, then the method 300 indicates at process block 312 that the current cut is invalid. At process block 310, the tracing processes are repeated for other input pins identified during the backward trace. In one exemplary embodiment, for example, the method 300 is iteratively performed for each new input pin identified in each backward search. Consequently, new input pins will be added to the cut and their drivers will be evaluated for retiming purposes. Because the other input pins identified at process block 310 may be driven by registers other than the selected register, additional retimed registers may be included at the retimeable cut. Once all the relevant input pins and output pins have been considered, the pins of the cut are returned. These pins, then, comprise the forward-retimeable cut at process block 254 of FIG. 14.

Figure 16:
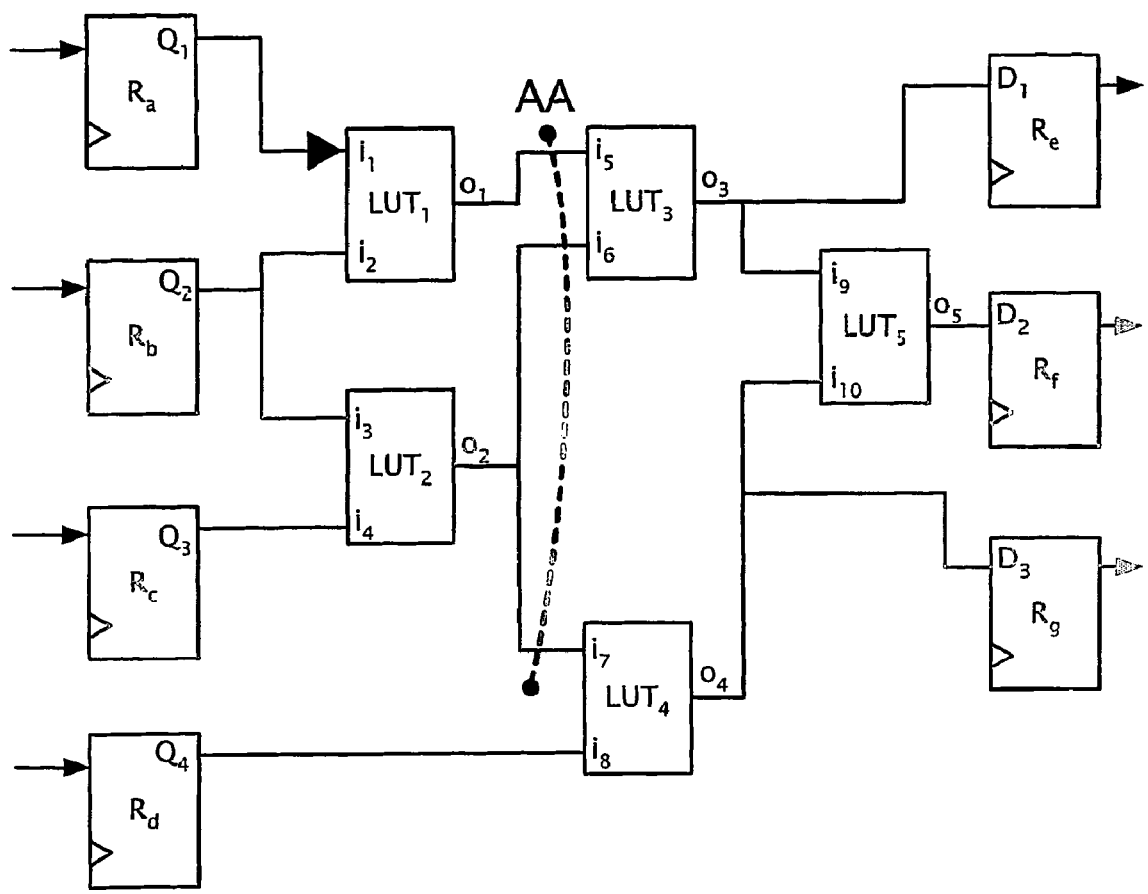
FIG. 16 is a block diagram illustrating the process of finding a first forward-retimeable cut in a logic cone of an FPGA according to the exemplary method illustrated in FIG. 15.
Figure 17:
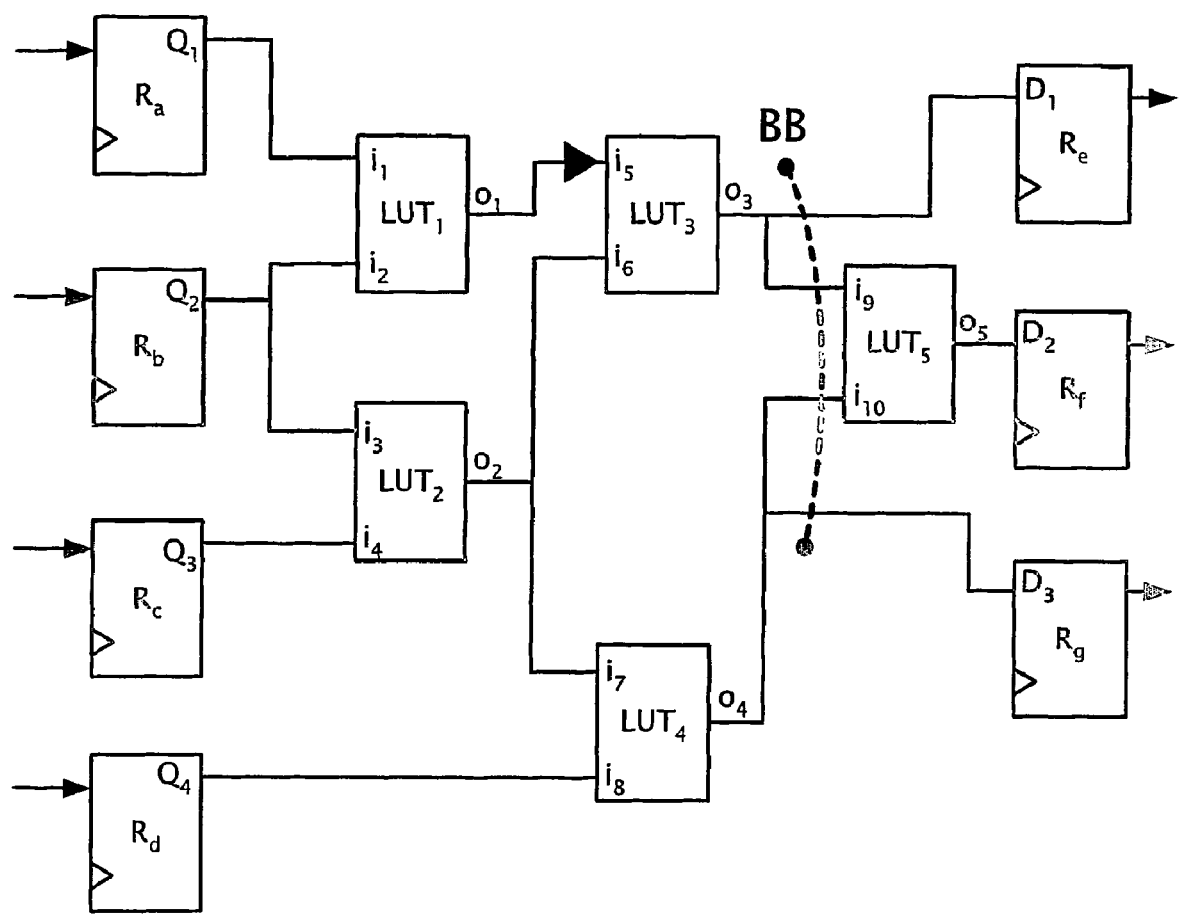
FIG. 17 is a block diagram illustrating the process of finding a second forward-retimeable cut in a logic cone of an FPGA according to the exemplary method illustrated in FIG. 15.

An example of forward retiming is illustrated in FIGS. 16 and 17. The illustrated example utilizes the exemplary methods described above with respect to FIGS. 12, 14, and 15. Assume for purposes of this example that the timing analysis (process block 202 of FIG. 12) indicates that register $R_a$ has the worst slack value along the signal path from register $R_a$ to register $R_e$ through $LUT_1$ and $LUT_3$, and is therefore the register selected to be retimed (process block 206 of FIG. 12). Also, assume for purposes of this example that the method 250 is performed for each input pin sequentially along the failing path. According to this exemplary method, input pin $i_1$ is the first pin selected for forward retiming (process block 252 of FIG. 14). Beginning at input pin $i_1$, a forward trace is performed from the output pins of the logic instance related to input pin $i_1$ (process block 302 of FIG. 15). Thus, a forward trace is performed from output pin $o_1$ of $LUT_1$. The forward trace identifies input pin $i_5$ as being the destination of the path portion originating at $o_1$, which is added to the cut (process block 304 of FIG. 15). A backward trace is performed from input pin $i_1$ and any other input pins of $LUT_1$ (process block 306 of FIG. 15). Tracing backward from input pin $i_1$, register $R_a$ is identified as the driver for the path and no other fan out from register $R_a$ is found. Tracing backward from input pin $i_2$, register $R_b$ and input pin $i_3$ in the fan-out from $R_b$ are identified. Register $R_b$ is evaluated to determine whether it is a retimeable driver (process block 308 of FIG. 15). In this case, register $R_b$ is equivalent to register $R_a$, and is thus retimeable. The forward retiming process 300 is repeated from newly identified input pin $i_3$ (process block 310 of FIG. 15). A forward trace from output pin $o_2$, which comprises the only output pin of $LUT_2$, identifies input pins $i_6$ and $i_7$ (process block 302 of FIG. 15). Input pins $i_6$ and $i_7$ are added to the cut (process block 304 of FIG. 15). A backward trace is performed from input pins $i_3$ and $i_4$ (process block 306 of FIG. 15). In certain embodiments, the backward trace from $i_3$ is not performed because the path portion from register $R_b$ to $i_2$ and $i_3$ has already been considered. From the backward trace from $i_4$, register $R_c$ is identified and evaluated for retiming purposes (process block 308 of FIG. 15). In this example, register $R_c$ is equivalent to register $R_a$, and is thus retimeable. With no other input pins to consider, the pins of the cut are returned as a valid retimeable cut. In particular, a cut containing the input pins $i_5$, $i_6$, and $i_7$ is returned (process block 312 of FIG. 15). This cut is illustrated in FIG. 16 as cut "AA." A timing evaluation is performed using the cut found to determine the cut delay and/or slack (process block 256 of FIG. 14). In this example, assume that the cut slack calculated shows an improvement from the original slack time for the failing path (e.g., from −2 to 1 ns). The cut is saved as the first cut (process blocks 258, 260 of FIG. 14) and the next input pin is considered (process blocks 264, 266 of FIG. 14).

FIG. 17 illustrates the process of finding the next forward-retimeable cut using the same exemplary method. According to this exemplary method, the next input pin is the next input pin along the failing path: input pin $i_5$. From input pin $i_5$, a forward trace is performed from output pin $o_3$ of $LUT_3$ (process block 302 of FIG. 15). The forward search identifies the input pin $D_1$ of register $R_e$ and the input pin $i_9$ of $LUT_5$, and adds them to the cut (process block 304 of FIG. 15). A backward trace is performed from the input pins $i_5$ and $i_6$ (process block 306 of FIG. 15). The backward trace from input pin $i_5$ identifies the output pin $o_1$ from $LUT_1$ and no other input pins in the fan-out from output pin $o_1$. In some embodiments, an evaluation is made to determine that the output pin $o_1$ is driven from registers $R_a$, $R_b$, which comprise retimeable registers (process block 308 of FIG. 15). From input pin $i_6$, the backward trace identifies output pin $o_2$ as the driver and input pin $i_7$ as another input pin in the fan-out from output pin $o_2$. An evaluation is made to determine that the output pin $o_2$ is driven from registers $R_b$, $R_c$, which comprise retimeable registers (process block 308 of FIG. 15), though this information could be saved from the process of finding cut "AA" described above. The forward tracing and backward tracing processes are then performed from input pin $i_7$, the other pin identified in the backward trace from input pin $i_6$ (process block 310 of FIG. 15). The forward trace from output pin $o_4$ of $LUT_4$ identifies input pin $i_{10}$ and the input $D_3$ of register $R_g$ (process block 302 of FIG. 15). Input pin $i_{10}$ and input $D_3$ of register $R_g$ are added to the cut (process block 304 of FIG. 15). The backward trace from input pin $i_8$ of $LUT_4$ identifies register $R_d$ as the driver (process block 306 of FIG. 15), which is confirmed as being a retimeable register (process block 308 of FIG. 15). Because there are no other input pins to consider, the method 300 ends, and the retimeable cut comprising input pin $D_1$ of register $R_e$, input pin $D_3$ of register $R_g$, and input pins $i_9$ and $i_{10}$ is returned (process block 312 of FIG. 15). This retimeable cut is illustrated as cut "BB" in FIG. 17. A timing evaluation is performed using the cut found to determine the cut delay and/or slack (process block 256 of FIG. 14). In this example, assume that the cut slack is calculated shows an improvement from the first cut time saved (e.g., 1 ns to 2 ns). Accordingly, cut "BB" is saved (process blocks 262, 263 of FIG. 14). Because there are no more input pins to consider along the failing path, cut "BB" is returned as the best forward-retimeable cut (process block 240 of FIG. 14).

An exemplary method 350 for finding a backward-retimeable cut is shown in FIG. 18. The method 350 may be implemented as part of a more general method of finding and evaluating retimeable cuts, such as that illustrated in FIG. 14, which may be modified to apply to backward-retimeable cuts. Similar to finding a forward-retimeable cut, the method 350 traces the paths of the logic cone forward and backward in order to identify and evaluate other instances that need to be retimed in order to retain circuit functionality. The process also helps ensure that any cut found is valid. For example, for a backward-retimeable cut, the process of forward tracing is useful to confirm that there are no fanins into the second (or right) partition of the logic cone and that the second (or right) partition of the retimeable cut drives sequential elements (e.g., a register of an FPGA).

The exemplary process 350 of one embodiment begins at the input pins of the logic instances along the failing path (e.g., from the input pin of the last logic instance along the failing path). At process block 352 of FIG. 18, the selected input pin and the related input pins of the logic instance are added to the cut. The relevant input pins may be identified, for example, from the netlist or other design database storing the circuit design. At process block 354, a forward trace is performed from the outputs of the logic instance associated with the selected input pin. In one embodiment, for example, forward tracing is performed from all of the output pins of the logic instance. The process of forward tracing identifies the input pins driven by a particular output (i.e., the destination of the signal from the particular output). For each input pin identified during the forward trace, a determination is made at process block 356 as to whether the input pin is coupled to a retimeable element. In one embodiment, for example, a circuit element is retimeable only if it is a sequential element or another logic instance. If the circuit element is a logic instance, an evaluation can be performed to determine whether the logic instance drives retimeable sequential elements. Any sequential element driven by the output pin can also be evaluated to determine whether it is equivalent or can be reconfigured to be equivalent to the relevant register (e.g., to the register being retimed or to a related retimed register). If any of the sequential elements are not capable of being retimed, then the method 350 indicates at process block 360 that the current cut is invalid. At process block 358, the process 350 is performed iteratively for the logic instances identified during the forward trace. In one exemplary embodiment, for example, the method 350 is iteratively performed for each new logic instance identified in the forward trace. Consequently, new input pins will be added to the cut and new output pins and the sequential elements they drive will be evaluated. During the iterative process, and in one particular implementation, input pins driven by logic instances whose input pins have already been added to the backward-retimeable cut are not added to the cut. Once all the relevant input pins and output pins have been considered, the pins of the cut are returned at process block 360. These pins, then, comprise the backward-retimeable cut.

Figure 19:
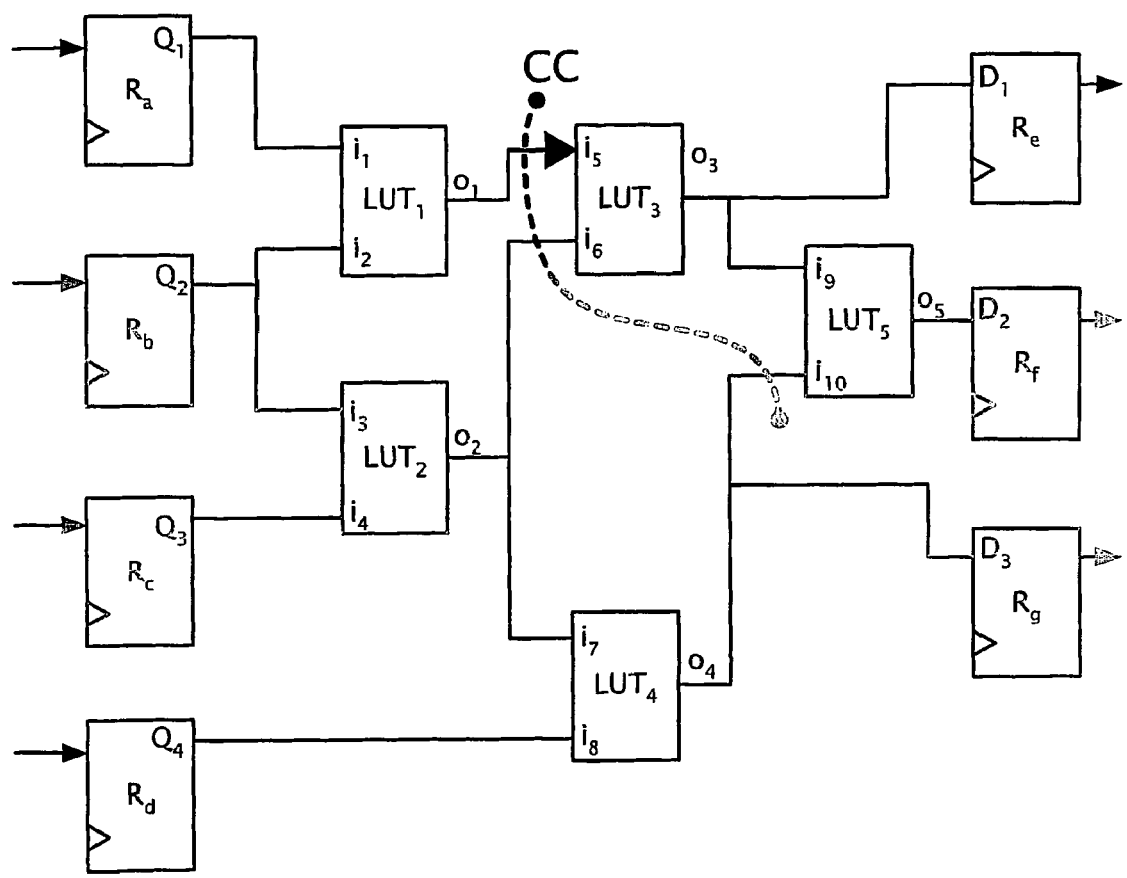
FIG. 19 is a block diagram illustrating the process of finding a first backward-retimeable cut in a logic cone of an FPGA according to the exemplary method illustrated in FIG. 18.
Figure 20:
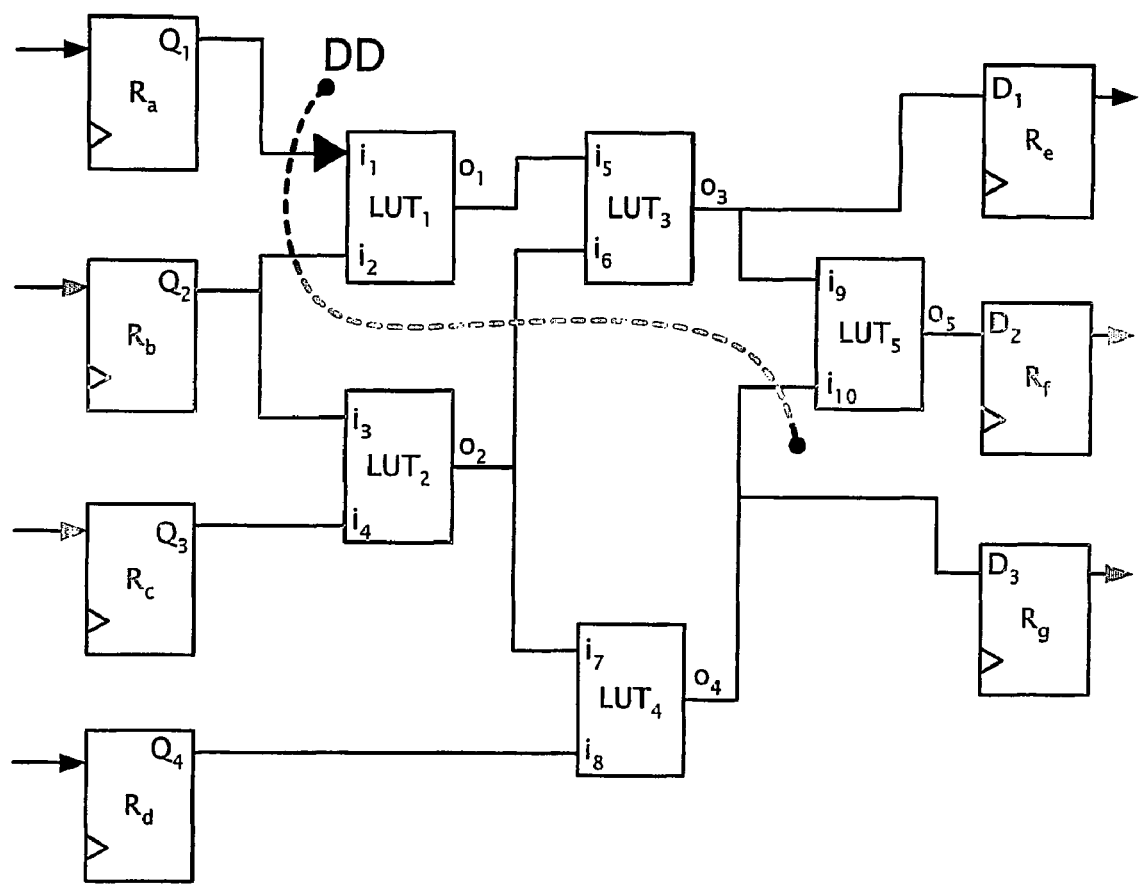
FIG. 20 is a block diagram illustrating the process of finding a second backward-retimeable cut in a logic cone of an FPGA according to the exemplary method illustrated in FIG. 18.

An example of backward retiming is illustrated in FIGS. 19 and 20. As with the example illustrated in FIGS. 16 and 17, assume that register $R_a$ has the worst slack value along the signal path from register $R_a$ to register $R_e$ through $LUT_1$ and $LUT_3$, and is therefore the register selected to be retimed (process block 206 of FIG. 12). Also, assume for purposes of this example that the method 350 is performed for each input pin sequentially along the failing path, beginning with the last logic instance. According to this exemplary method, then, input pin is $i_5$ the first pin selected for backward retiming (process block 352 of FIG. 18). Beginning at input pin $i_5$, input pins $i_5$ and $i_6$ are added to the cut (process block 352 of FIG. 18). A forward trace is performed from output pin $o_3$ of $LUT_3$ (process block 354 of FIG. 18). The forward trace identifies input pin $D_1$ and input pin $i_9$ as being the destinations of the signal originating at $o_3$. Register $R_e$ is evaluated to determine whether it is a retimeable element (process block 356 of FIG. 18). Assume that in this case, register $R_e$ is retimeable. $LUT_5$ is also evaluated to determine whether it drives retimeable circuit elements. In this case, $LUT_5$ drives register $R_f$, which is assumed to be retimeable. The process 350 is repeated from newly identified input pin $i_9$ and $LUT_5$ (process block 358 of FIG. 18). In the iterative process, input pin $i_{10}$ is added to the cut (process block 352 of FIG. 18). In this particular example, input pin $i_9$ is not added to the cut because it is driven by a logic instance whose input pins are already included in the cut (i.e., input pin $i_9$ is driven by $LUT_3$, whose input pins $i_5$ and $i_6$ are already in the cut). A forward trace from output pin $o_5$, which comprises the only output pin of $LUT_5$, identifies input pin $D_2$ of register $R_f$, which has already been determined to be retimeable (process blocks 354 and 356 of FIG. 18). With no other logic instances to consider, the pins of the cut are returned as a valid backward-retimeable cut. In particular, a cut containing the input pins $i_5$, $i_6$, and $i_{10}$ is returned as a valid backward-retimeable cut (process block 360 of FIG. 18). This cut is illustrated in FIG. 19 as cut "CC." A timing evaluation is performed using the cut found to determine the cut slack (process block 256 of FIG. 14), the cut is saved as the first cut (process blocks 258, 260 of FIG. 14) and the next input pin is considered (process blocks 264, 266 of FIG. 14).

FIG. 20 illustrates the process of finding the next backward-retimeable cut using the same exemplary method. According to this exemplary method, the next input pin is the immediately previous input pin along the failing path: input pin $i_1$. Input pin $i_1$ and $i_2$ are added to the cut (process block 352 of FIG. 18). A forward trace is performed from output pin $o_1$ of $LUT_1$ (process block 354 of FIG. 18). The forward search identifies the input pin $i_5$ of $LUT_3$. An evaluation is performed to determine whether $LUT_3$ drives retimeable sequential elements. Register $R_e$ and the input pin $i_9$ of $LUT_5$ are identified and evaluated. Because register $R_e$ is retimeable and because $LUT_5$ drives register $R_f$, which is also retimeable, the method proceeds. The process 350 is repeated in a first iteration from newly identified input pin $i_5$ and $LUT_3$ (process block 358 of FIG. 18). Input pin $i_6$ is added to the cut (process block 352 of FIG. 18). In this example, however, input pin $i_5$ is not added to the cut because it is driven by a logic instance whose input pins are already included in the cut (i.e., input pin $i_5$ is driven by $LUT_1$, whose input pins $i_1$ and $i_2$ are already in the cut). A forward trace from output pin $o_3$, which comprises the only output pin of $LUT_3$, identifies register $R_e$ and input pin $i_9$ of $LUT_5$, which have already been determined to be retimeable (process blocks 354 and 356 of FIG. 18). The process 350 is then repeated in a second iteration from input pin $i_9$ and $LUT_5$ (process block 358 of FIG. 18). Input pin $i_{10}$ is added to the cut (process block 352 of FIG. 18) but input pin $i_9$ is not because it is driven by a logic instance whose input pins are already included in the cut. A forward trace from output pin $o_5$ identifies register $R_f$, which has already been determined to be retimeable (process blocks 354 and 356 of FIG. 18). With no other logic instances to consider, the pins of the cut ($i_1$, $i_2$, $i_6$, and $i_{10}$) are returned as a valid backward-retimeable cut. This retimeable cut is illustrated as cut "DD" in FIG. 20. A timing evaluation is performed using the cut found to determine the cut delay and/or slack (process block 256 of FIG. 14). In this example, assume that the cut slack is calculated and shows an improvement from the first cut time saved (e.g., 1 ns from 2 ns). Accordingly, cut "DD" is saved (process blocks 262, 263 of FIG. 14). Because there are no more input pins to consider along the failing path, cut "DD" is returned as the best backward-retimeable cut (process block 240 of FIG. 14).

A number of experiments have been performed using embodiments of the exemplary method for finding the best forward-retimeable cut illustrated in FIGS. 12, 14, and 15. In particular, embodiments of the exemplary method were used to retime designs implemented in Xilinx® Virtex-II® FPGAs. Table 1 shows the results of experiments that involved ten FPGA designs having between 800 to 8000 slices (the fundamental architectural unit for Xilinx® devices). For designs having multiple clock domains, the clock domain having the worst timing violation is the one shown in the table. All of the results shown in Table 1 were obtained after a final place and route was performed. Thus, the clock times shown are actual clock cycle times. The first column identifies the ten designs as cases one through ten and further includes the averages of the cases. The second column, labeled "slices," lists the number of slices for the respective designs. The third column, labeled "syn," lists the clock cycle time obtained after logic synthesis without any retiming. The fourth column, labeled "ret1," shows the clock cycle time obtained using a first version of the method outlined above and illustrated in FIGS. 12, 14, and 15. In particular, the first version of the method used a physical-delay model, placement restrictions (e.g., criteria used to prevent local congestion of registers during placement), control-signal separation techniques, and searched for the best forward-retimeable cut according to the best improvement in slack. The values in parentheses in the fourth column indicate the number of registers added and removed, respectively, as a result of the retiming. The fifth column, labeled "imp1," shows the percentage improvement of the circuit retimed using the exemplary method from the circuit obtained after logical synthesis. The sixth column, labeled "ret2," indicates the results of a second version of the retiming algorithm, and includes the number of minutes used to perform the retiming program in parentheses. The seventh column, labeled "imp2," shows the percentage improvement of the circuit retimed using the second version of the exemplary method from the circuit obtained after logical synthesis. The second version of the retiming algorithm "ret2" shown in the sixth and seventh columns used a wire-load delay model for timing instead of the more accurate physical-delay model. Moreover, the second version did not utilize any form of placement restriction. While the lack of physical information may lead to retiming under a less accurate timing estimation, the overall outcome is not as good as the first version of the method on account of the reduced timing accuracy. Consequently, the improvement is 8.2% on average. In some cases, however, worse timing was obtained than that achieved by logical synthesis. The eighth column, labeled "ret3," indicates the timing results of a third version of the retiming algorithm. The number of registers that were added and removed, respectively, is shown in parentheses. The ninth column, labeled "imp3," shows the percentage improvement of the circuit retimed using the third version of the exemplary method from the circuit obtained after logical synthesis. In the third version of the retiming method, the control-signal separation procedure used to relax structural constraints was omitted from the first version. As shown in the ninth column, the average improvement in using the third version was 7.14%. Moreover, as indicated in the eighth column, the number of registers that were removed and added is significantly less than in the first version. Finally, the tenth column, labeled "ret4," indicates the results of a fourth version of the retiming algorithm. The number of minutes used to run the retiming process is shown in parentheses. The eleventh column, labeled "imp4," shows the percentage improvement of the circuit retimed using the fourth version of the exemplary method from the circuit obtained after logical synthesis. In the fourth version of the algorithm, the first version is modified to exclude physical-placement considerations, control-signal separation, and the searching of the best cut. As a result of these modifications, the overall timing benefit of the algorithm is mostly gone, with an average improvement of 1.9% as shown in the eleventh column, and many degraded cases as shown in the tenth column. As can be seen by comparing the run times of the fourth version with the second version shown in the sixth column, cut-based retiming that includes a process for cut searching can significantly decrease the run-time of the retiming algorithm. Indeed, an average run-time improvement of 68.3% is exhibited by the second version of the method in comparison to the fourth version.

402 (internal or external to the server computer). For example, the server computer 400 can be configured to retime circuit designs using any of the embodiments described above (e.g., as part of an EDA software tool). The server computer 400 may be coupled to a network shown generally at 404, which can comprise, for example, a wide-area network, a local-area network, a client-server network, the Internet, or other such network. One or more client computers, such as those shown at 406, 408, may be coupled to the network 404 using a network protocol.

Figure 21:
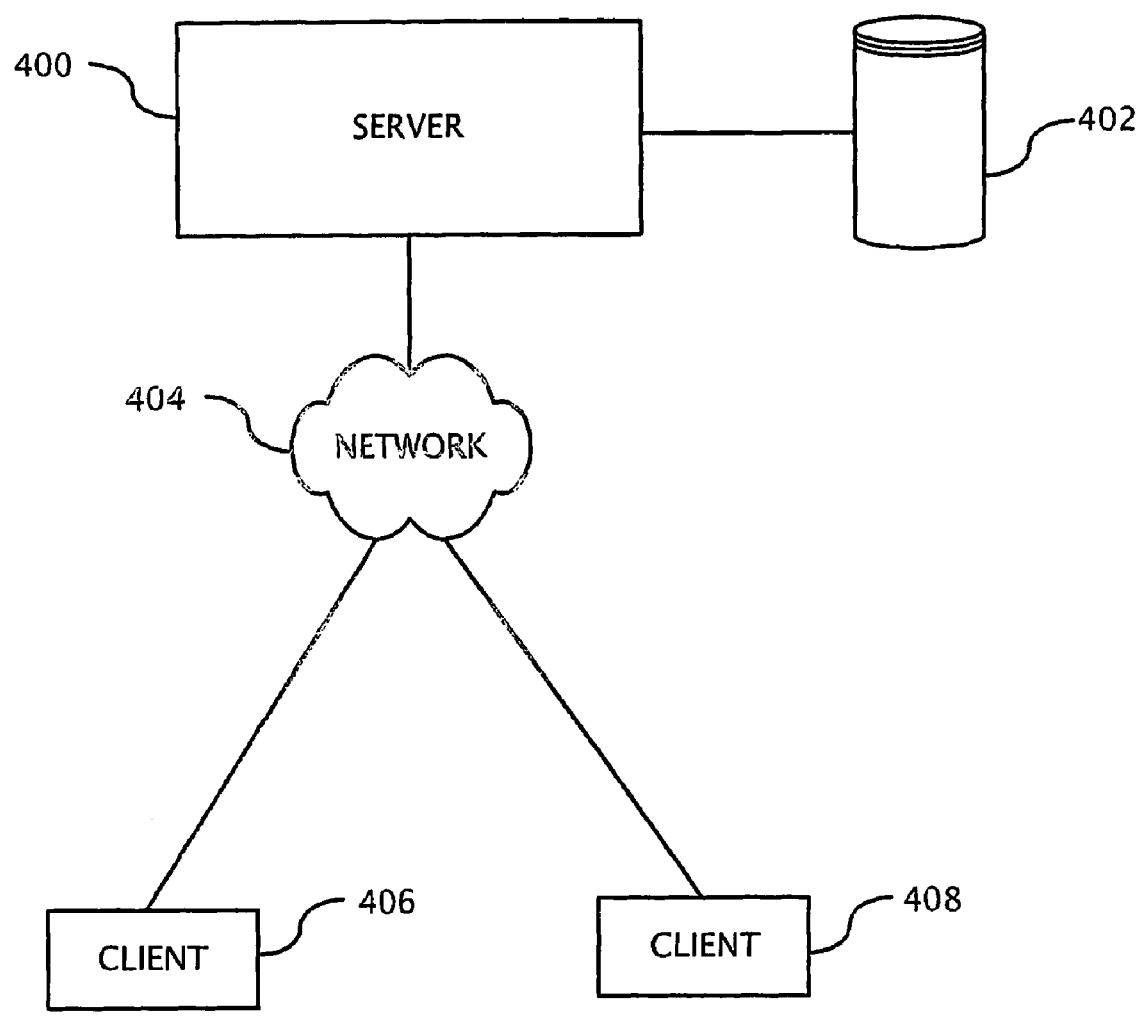
FIG. 21 is a system diagram of a client/server network as may be used in performing the disclosed retiming methods.
Figure 22:
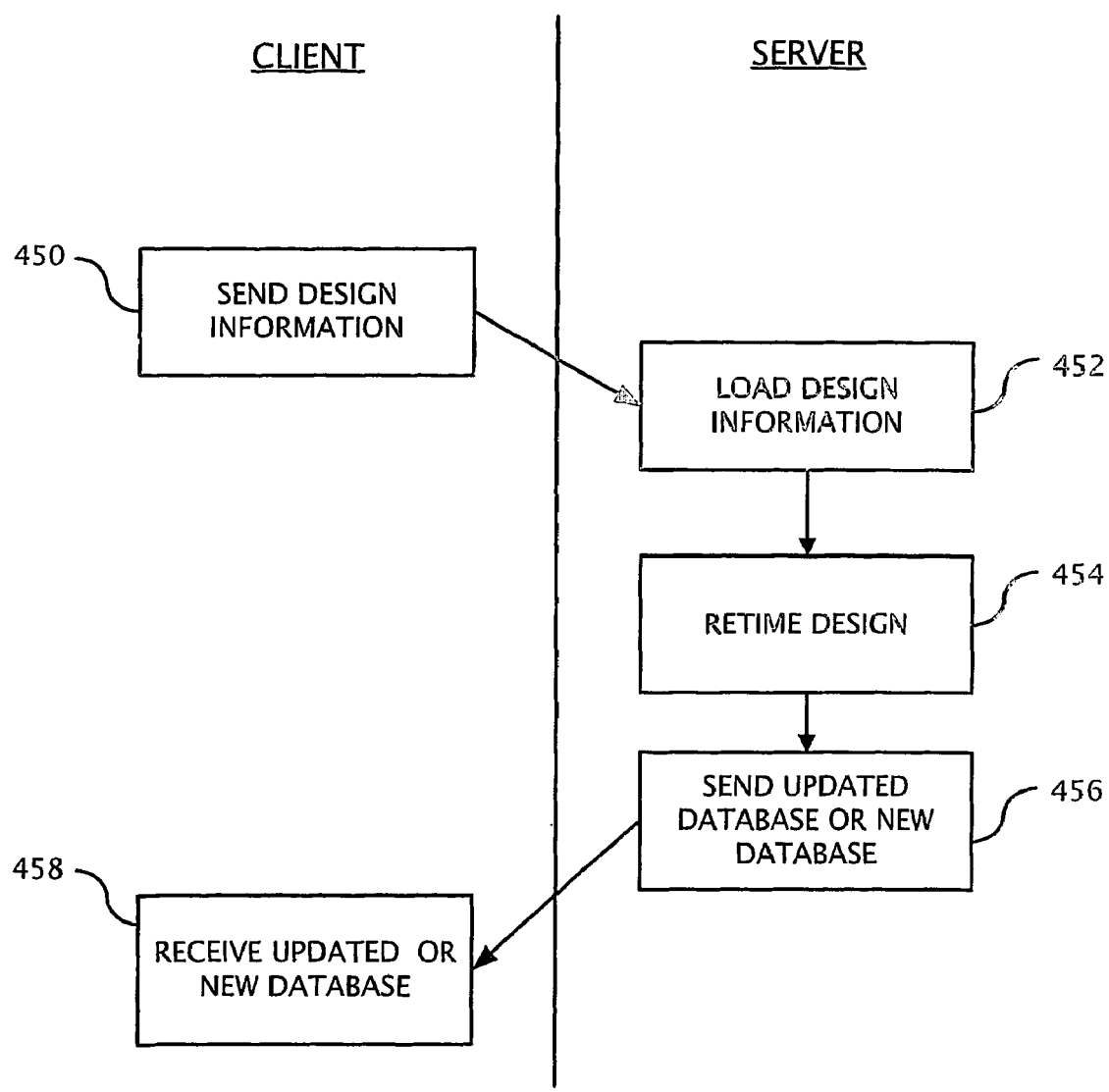
FIG. 22 is a flowchart showing the creation of a database using, for example, the network of FIG. 21.

FIG. 22 shows that a database containing design information (e.g., a netlist) may be updated (or modified) to include design information for a circuit retimed according to any of the embodiments disclosed herein using a remote server computer, such as the server computer 400 shown in FIG. 21. In process block 450, for example, the client computer sends design data relating to a circuit to be retimed. For instance, the client computer may send a netlist or other EDA design database. In process block 452, the data is received and loaded by the server computer. In process block 454, the circuit defined by the database is retimed according to any of the disclosed embodiments. A new database representing the retimed design can then be created. This new design data can be stored as an updated (or modified) version of the design database or as one or more separate databases. In process block 456, the server computer sends the updated database or other databases to the client computer, which receives the database in process block 458. It should be apparent to those skilled in the art that the example shown in FIG. 22 is not the only way to update a design database to include the relevant design data. For instance, the design data may be stored in a computer-readable media that is not on a network and that is sent separately to the server. Or, the server computer may perform only a portion of the design procedures.

Having illustrated and described the principles of the invention by several embodiments, it should be apparent that

TABLE 1

Timing Improvements From Four Exemplary Retiming Methods

| cases   | slices | syn  | ret1          | imp1  | ret2         | imp2  | ret3          | imp3  | ret4         | imp4  |
|---------|--------|------|---------------|-------|--------------|-------|---------------|-------|--------------|-------|
| Case 1  | 817    | 8.4  | 7.6 (16, 8)   | 9.5%  | 8.5 (2)      | -1.2% | 8.6 (29, 11)  | -2.4% | 8.4 (10)     | 0     |
| Case 2  | 1,004  | 21.1 | 18.3 (30, 10) | 13.3% | 18.5 (14)    | 12.3% | 19.3 (98, 44) | 8.5%  | 20.6 (30)    | 2.4%  |
| Case 3  | 1,681  | 4.2  | 2.9 (900, 258)| 40%   | 3.9 (3)      | 7.1%  | 3.2 (907, 265)| 3.1%  | 4.2 (5)      | 0     |
| Case 4  | 1,861  | 34   | 27.7 (465, 226)| 18.5%| 29.1 (9)     | 14.4% | 28 (246, 138) | 17.6% | 34.1 (25)    | -0.3% |
| Case 5  | 2,062  | 52.1 | 42.1 (306, 319)| 19.2%| 44.9 (10)    | 13.8% | 45.1 (263, 230)| 13.4%| 48.9 (23)    | 6.1%  |
| Case 6  | 2,224  | 8.8  | 7.6 (7, 4)    | 10.6% | 8.5 (6)      | 3.4%  | 7.8 (7, 3)    | 11.4% | 8.5 (14)     | 3.4%  |
| Case 7  | 2,510  | 15.8 | 13.1 (650, 295)| 17.1%| 12.9 (10)    | 18.4% | 14.6 (0, 0)   | 7.6%  | 15.9 (26)    | -0.2% |
| Case 8  | 3,161  | 26.2 | 24.3 (142, 63)| 7.3%  | 24.5 (18)    | 6.5%  | 26 (137, 74)  | 0.8%  | 25.4 (37)    | 3.1%  |
| Case 9  | 3,135  | 26.5 | 23.3 (155, 48)| 12.1% | 24.8 (22)    | 6.4%  | 24.1 (146, 58)| 9.1%  | 24.8 (73)    | 6.3%  |
| Case 10 | 8,085  | 22.1 | 19.3 (165, 43)| 12.7% | 21.9 (20)    | 0.9%  | 21.6 (0, 0)   | 2.3%  | 22.6 (117)   | -2.3% |
| Avg.    |        |      | (284, 127)    | 16.0% | (11.4)       | 8.2%  | (183, 82)     | 7.14  | (36)         | 1.9%  |

Any of the aspects of the technology described above may be performed or designed using a distributed computer network. FIG. 21 shows one such exemplary network. A server computer 400 can have an associated storage device those embodiments can be modified in arrangement and detail without departing from the principles of the invention. The described embodiments are illustrative only and should not be construed as limiting the scope of the present invention.

For instance, the present disclosure encompasses the methods described as well as any integrated circuit retimed by the disclosed methods (e.g., an FPGA retimed by any of the disclosed methods). The present invention encompasses all such embodiments as may come within the scope and spirit of the following claims and equivalents thereto.

What is claimed is:

1. A method for retiming an integrated circuit in an electronic design automation (EDA) environment, comprising:
   performing a timing analysis for one or more paths in the integrated circuit to obtain delay times for a signal propagating along the paths;
   selecting a path based on the delay times obtained, the path selected having a delay time that fails a timing constraint, the path selected originating at a source sequential element and ending at a destination sequential element, the path selected further comprising two or more logic instances;
   determining a retiming location along the path selected where one of the source sequential element or the destination sequential element can be repositioned in order to satisfy the timing constraint, the retiming location being at least two logic instances from the one of the source sequential element or the destination sequential element;
   updating a design database of the integrated circuit to reposition the one of the source sequential element or the destination sequential element to the retiming location; and storing the updated design database.

2. The method of claim 1, wherein the act of performing the timing analysis further comprises determining slack values using the delay times obtained and the timing constraint, and wherein the act of selecting the path further comprises evaluating the slack values.

3. The method of claim 1, wherein the act of determining the retiming location comprises determining whether one or more additional sequential elements need to be repositioned to the retiming location or to one or more additional retiming locations in order to maintain circuit functionality.

4. The method of claim 3, wherein the retiming location and the one or more additional retiming locations comprise a retimeable cut.

5. The method of claim 1, wherein the act of determining the retiming location comprises:
   performing at least one forward trace from one or more output pins of a logic instance across which the one of the source sequential element or the destination sequential element can be repositioned; and
   performing at least one backward trace from one or more input pins of the logic instance across which the one of the source sequential element or the destination sequential element can be repositioned.

6. The method of claim 1, further comprising determining a retimed initial state for the one of the source sequential element or the destination sequential element.

7. The method of claim 1, further comprising relaxing architectural constraints of the one of the source sequential element or the destination sequential element.

8. The method of claim 7, wherein the act of relaxing architectural constraints comprises separating one or more control signals from the one of the source sequential element or the destination sequential element.

9. The method of claim 1, wherein the act of determining the retiming location comprises:
   comparing slack values associated with multiple possible retiming locations in the path selected; and
   selecting the retiming location from the multiple possible retiming locations based on the slack values.

10. The method of claim 9, wherein the retiming location selected results in the greatest improvement in slack value for the path selected.

11. The method of claim 1, wherein the integrated circuit is a field programmable gate array.

12. An integrated circuit retimed by the method of claim 1.

13. A computer-readable medium storing computer-executable instructions for causing a computer system to perform the method of claim 1.

14. A computer-readable medium storing a design database that includes design information for an integrated circuit retimed by the method of claim 1.

15. A method for retiming an integrated circuit in an electronic design automation (EDA) environment, comprising:
   identifying a failing signal path in the integrated circuit, the failing signal path originating at a source sequential element, extending through one or more logic instances of a logic cone, and ending at a destination sequential element, the failing signal path having a delay time that fails to meet a timing constraint;
   selecting a location along the failing signal path where one of the source sequential element or the destination sequential element can be repositioned to improve the delay time of the failing signal path, the location selected being coupled to an input of a related one of the logic instances;
   from the location selected, searching output paths and input paths of the related logic instance to identify one or more additional sequential elements to reposition in order to retain circuit functionality, the act of searching the output paths and the input paths comprising identifying one or more additional locations in the integrated circuit for repositioning the one or more additional sequential elements in order to retain circuit functionality; and
   storing the location selected and one or more additional locations identified.

16. The method of claim 15, wherein the location selected and the one or more additional locations identified comprise a retimeable cut.

17. The method of claim 15, wherein the location selected is a portion of a backward-retimeable cut, and the act of searching the output paths and the input paths comprises verifying that the related logic instance drives one or more sequential elements.

18. The method of claim 15, wherein the location selected is a portion of a forward-retimeable cut, and the act of searching the output paths and the input paths comprises verifying that the related logic instance is driven by one or more sequential elements or by one or more constant input/output pins.

19. The method of claim 15, wherein the location selected is one of multiple possible locations for relocating the one of the source sequential element or the destination sequential element, and wherein the location selected results in the greatest improvement in slack time for the failing signal path.

20. The method of claim 15, further comprising determining a retimed initial state for the one of the source sequential element or the destination sequential element that can be repositioned or for one or more of the additional sequential elements identified.

21. The method of claim 15, further comprising relaxing architectural constraints of the one of the source sequential element or the destination sequential element that can be repositioned or for one or more of the additional sequential elements identified.

22. The method of claim 15, wherein the integrated circuit is a field programmable gate array.

23. An integrated circuit retimed by the method of claim 15.

24. A computer-readable medium storing computer-executable instructions for causing a computer system to perform the method of claim 15.

25. A computer-readable medium storing a design database that includes design information for an integrated circuit retimed by the method of claim 15.

26. A method for identifying a retimeable cut in an integrated circuit design comprising:
    selecting a signal path to be retimed, the signal path originating at a source sequential element, extending through one or more logic instances, and ending at a destination sequential element;
    finding a retimeable cut along the signal path, the retimeable cut including an indication of a location across one or more of the logic instances where one of the source sequential element or the destination sequential element can be relocated, the act of finding the retimeable cut comprising,
    performing a forward trace from one or more output pins of a selected logic instance in the signal path, and
    performing a backward trace from one or more input pins of the selected logic instance in the signal path, and
    performing a timing evaluation using the retimeable cut to determine delay times associated with the retimeable cut; and saving the retimeable cut if the delay times do not violated related timing constraints.

27. The method of claim 26, wherein the retimeable cut is a first retimeable cut, the method further comprising:
    finding a second retimeable cut along the signal path to be retimed;
    performing a timing evaluation using the second retimeable cut to determine delay times associated with the second retimeable cut; and
    comparing the delay times associated with the first retimeable cut with the delay times associated with the second retimeable cut to determine a best retimeable cut.

28. The method of claim 26, wherein the best retimeable cut results in the greatest overall improvement in slack values for the signal path to be retimed.

29. The method of claim 26, wherein the retimeable cut is a forward-retimeable cut.

30. The method of claim 26, wherein the retimeable cut is a backward retimeable cut.

31. The method of claim 26, further comprising determining a retimed initial state for at least one sequential element that is included in the retimeable cut.

32. The method of claim 26, further comprising separating one or more control signals of at least one sequential element that is included in the retimeable cut.

33. The method of claim 26, wherein the integrated circuit design is for a field programmable gate array.

34. An integrated circuit retimed by the method of claim 26.

35. A computer-readable medium storing computer-executable instructions for causing a computer system to perform the method of claim 26.

36. A computer-readable medium storing a design database that includes design information for an integrated circuit retimed by the method of claim 26.

37. A method for retiming an integrated circuit in an electronic design automation (EDA) environment, comprising:
    a step for performing a timing analysis for one or more paths in the integrated circuit to obtain slack values;
    a step for selecting one of the paths based on the slack values obtained;
    a step for determining a retimeable cut along the path selected, the retimeable cut comprising a set of input pins for one or more logic instances in the integrated circuit to which one or more retimed sequential elements can be directly coupled, respectively, in order to improve the slack value of the path selected, and to which the one or more logic instances were not previously directly coupled, the retimeable cut being automatically selected from two or more possible cuts along the path selected; and
    a step for saving the retimable cut.

38. The method of claim 37, wherein the set of input pins is associated with at least a logic instance located at least two logic instances away from at least one of the retimed sequential elements.

39. The method of claim 37, further comprising a step for determining an initial 19 state for at least one of the retimed sequential elements.

40. The method of claim 37, further comprising a step for relaxing architectural constraints of at least one of the retimed sequential elements.

41. The method of claim 37, further comprising a step for performing a forward trace and a backward trace from a logic instance having inputs pins in the retimeable cut.

42. The method of claim 37, wherein the retimeable cut is a backward retimeable cut.

43. The method of claim 37, wherein the retimeable cut is a forward-retimeable cut.

44. An integrated circuit retimed by the method of claim 37.

45. A computer-readable medium storing computer-executable instructions for causing a computer system to perform the method of claim 37.

46. A computer-readable medium storing a design database that includes design information for an integrated circuit retimed by the method of claim 37.

* * * * *